US011405953B2

(12) United States Patent
Patil et al.

(10) Patent No.: US 11,405,953 B2
(45) Date of Patent: **\*Aug. 2, 2022**

(54) TRIGGER-BASED RANDOM ACCESS IN A MULTIPLE BSSID NETWORK

(71) Applicant: QUALCOMM Incorporated, San Diego, CA (US)

(72) Inventors: Abhishek Pramod Patil, San Diego, CA (US); Alfred Asterjadhi, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/097,963

(22) Filed: Nov. 13, 2020

(65) Prior Publication Data

US 2021/0068151 A1    Mar. 4, 2021

Related U.S. Application Data

(63) Continuation of application No. 15/949,190, filed on Apr. 10, 2018, now Pat. No. 10,849,159.
(Continued)

(51) Int. Cl.
*H04W 74/02* (2009.01)
*H04W 74/00* (2009.01)
(Continued)

(52) U.S. Cl.
CPC .......... *H04W 74/02* (2013.01); *H04W 48/12* (2013.01); *H04W 68/005* (2013.01);
(Continued)

(58) Field of Classification Search
CPC ... H04W 48/12; H04W 68/005; H04W 74/02; H04W 74/005; H04W 74/006;
(Continued)

(56) References Cited

U.S. PATENT DOCUMENTS 7,002,936 B2    2/2006  Agrawal et al.
9,002,393 B2    4/2015  Wang et al.
(Continued)

FOREIGN PATENT DOCUMENTS

CN    101076973 A    11/2007
CN    101170793 A    4/2008
(Continued)

OTHER PUBLICATIONS

Bin, C., et al., "Power Allocation in Wireless Network Virtualization Based on Resource Sharing", Journal on Communications, vol. 37, No. 2, Feb. 25, 2016, pp. 1-9.
(Continued)

*Primary Examiner* — Melanie Jagannathan
(74) *Attorney, Agent, or Firm* — Paradice and Li LLP/Qualcomm

(57) ABSTRACT

This disclosure provides systems, methods, and apparatuses for allocating wireless resources to a multiple basic service set identifier (BSSID) set including a number of BSSIDs each associated with a corresponding one of a number of access points (APs). An AP may allocate random access resources for use by stations belonging to the multiple BSSID set using a number of association identifier (AID) values based on a group AID mapping contained in a partial virtual bitmap of a traffic indication map (TIM) element. The AP may transmit a trigger frame containing the number of AID values to the stations belonging to the multiple BSSID set.

30 Claims, 19 Drawing Sheets

Related U.S. Application Data

(60) Provisional application No. 62/486,451, filed on Apr. 17, 2017.

(51) Int. Cl.
  *H04W 74/08* (2009.01)
  *H04W 48/12* (2009.01)
  *H04W 76/11* (2018.01)
  *H04W 68/00* (2009.01)
  *H04W 84/12* (2009.01)
  *H04W 28/02* (2009.01)

(52) U.S. Cl.
  CPC ....... *H04W 74/006* (2013.01); *H04W 74/008* (2013.01); *H04W 74/085* (2013.01); *H04W 74/0833* (2013.01); *H04W 76/11* (2018.02); *H04W 28/0263* (2013.01); *H04W 84/12* (2013.01)

(58) Field of Classification Search
  CPC ............. H04W 74/008; H04W 74/085; H04W 74/0833; H04W 76/11
  See application file for complete search history.

(56) References Cited

U.S. PATENT DOCUMENTS

| | | | |
|---|---|---|---|
| 9,204,371 | B2 | 12/2015 | Liu |
| 9,338,732 | B2 | 5/2016 | Cherian et al. |
| 9,526,103 | B2 | 12/2016 | Park |
| 10,237,891 | B1 | 3/2019 | Chu et al. |
| 10,462,816 | B2 | 10/2019 | Patil et al. |
| 2006/0187864 | A1 | 8/2006 | Wang et al. |
| 2009/0016306 | A1 | 1/2009 | Wang et al. |
| 2013/0162279 | A1 | 6/2013 | Achkir et al. |
| 2013/0208667 | A1 | 8/2013 | Merlin et al. |
| 2014/0211642 | A1 | 7/2014 | Du et al. |
| 2015/0009879 | A1 | 1/2015 | Kim et al. |
| 2015/0124776 | A1 | 5/2015 | Lee et al. |
| 2015/0312753 | A1 | 10/2015 | Asterjadhi et al. |
| 2017/0171810 | A1* | 6/2017 | Cariou .............. H04W 52/0206 |
| 2017/0303245 | A1 | 10/2017 | Asterjadhi et al. |
| 2018/0167885 | A1* | 6/2018 | Tanaka .................. H04W 84/12 |
| 2018/0199271 | A1 | 7/2018 | Viger et al. |
| 2018/0295567 | A1 | 10/2018 | Ko et al. |
| 2018/0302922 | A1 | 10/2018 | Patil et al. |
| 2018/0302923 | A1 | 10/2018 | Patil et al. |
| 2019/0313466 | A1 | 10/2019 | Ko et al. |
| 2020/0037395 | A1 | 1/2020 | Ko et al. |
| 2021/0385692 | A1* | 12/2021 | Kwon ............... H04W 52/0229 |

FOREIGN PATENT DOCUMENTS

| | | |
|---|---|---|
| CN | 102726103 A | 10/2012 |
| CN | 104321998 A | 1/2015 |
| CN | 104584473 A | 4/2015 |
| CN | 105979608 A | 9/2016 |
| EP | 3082370 A4 | 12/2016 |
| WO | WO-2013037270 A1 | 3/2013 |
| WO | WO-2013063598 A2 | 5/2013 |
| WO | WO-2013162279 A1 | 10/2013 |
| WO | WO-2014120609 A1 | 8/2014 |
| WO | WO-2014121165 A2 | 8/2014 |
| WO | WO-2016123395 | 8/2016 |

OTHER PUBLICATIONS

IEEE: "IEEE 802.11 Wireless LAN Standard", May 10, 2011, 56 Pages.
International Preliminary Report on Patentability—PCT/US2018/027094, The International Bureau of WIPO—Geneva, Switzerland, dated Oct. 31, 2019.
International Preliminary Report on Patentability—PCT/US2018/027130, The International Bureau of WIPO—Geneva, Switzerland, dated Oct. 31, 2019.
International Search Report and Written Opinion—PCT/US2018/027094—ISA/EPO—dated Jul. 3, 2018.
International Search Report and Written Opinion—PCT/US2018/027130—ISA/EPO—dated Jul. 11, 2018.
European Search Report—EP20215893—Search Authority—The Hague—dated Mar. 19, 2021.

* cited by examiner

TRIGGER-BASED RANDOM ACCESS IN A MULTIPLE BSSID NETWORK

CROSS-REFERENCE TO RELATED APPLICATION

This Patent Application is a continuation of and claims priority to U.S. patent application Ser. No. 15/949,190 entitled "TRIGGER-BASED RANDOM ACCESS IN A MULTIPLE BSSID NETWORK" filed on Apr. 10, 2018, now U.S. Pat. No. 10,849,159, which claims priority to U.S. Provisional Patent Application No. 62/486,451 entitled "TRIGGER-BASED RANDOM ACCESS IN A MULTIPLE BSSID NETWORK" filed on Apr. 17, 2017, all of which are assigned to the assignee hereof. The disclosures of all prior Applications are considered part of and are incorporated by reference in this Patent Application in their respective entireties.

TECHNICAL FIELD

This disclosure relates generally to wireless networks, and specifically to allocating resource units in wireless networks.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

An AP may create and operate multiple BSSs at the same time, and may assign (or associate) a number of wireless devices to each of the BSSs. Each of the multiple BSSs may operate independently of each other and yet use the same AP. Because different BSSs may include different numbers of wireless devices, may have different security parameters and access privileges, and may include different types of wireless devices (such as IoT devices, Wi-Fi devices, and so on), it may be desirable for the AP to prioritize the allocation of resources between multiple BSSs.

SUMMARY

The systems, methods and devices of this disclosure each have several innovative aspects, no single one of which is solely responsible for the desirable attributes disclosed herein.

One innovative aspect of the subject matter described in this disclosure can be used as a method to allocate wireless resources to a multiple basic service set identifier (BSSID) set including a number of BSSIDs each associated with a corresponding one of a number of access points (APs). In some implementations, the method may be performed by a first AP associated with a transmitted BSSID (Tx BSSID), and each of the other APs may be associated with a corresponding non-transmitted BSSID (non-Tx BSSID). The method may include allocating random access resources for use by stations belonging to the multiple BSSID set using a number of association identifier (AID) values based on a group AID mapping contained in a partial virtual bitmap of a traffic indication map (TIM) element, and transmitting a trigger frame containing the number of AID values to the stations belonging to the multiple BSSID set. In some implementations, the number of AID values contained in the trigger frame may identify, for the allocation of the random access resources, at least one of a group of stations, a specific BSSID, a group of BSSIDs, and all of the stations belonging to the multiple BSSID set.

When the trigger frame is transmitted from the Tx BSSID, the transmitter address (TA) of the trigger frame is set to the MAC address of the Tx BSSID. The allocation of random access resources may include allocating one or more random resource units (RUs) for use by stations associated with a selected one of the non-Tx BSSIDs by setting an AID value to a BSSID index of the selected non-Tx BSSID. The trigger frame may contain the AID value set to the BSSID index of the selected non-Tx BSSID to allocate the one or more random RUs for use by stations associated with the selected non-Tx BSSID for uplink (UL) transmissions. In addition, or in the alternative, the allocation of random access resources may include allocating one or more random resource units (RUs) for use by stations associated with the Tx BSSID by setting an AID value to zero. The trigger frame may contain the AID value set to zero to allocate the one or more random RUs for use by stations associated with the Tx BSSID for uplink (UL) transmissions. In addition, or in the alternative, the allocation of random access resources may include allocating one or more random resource units (RUs) for use by all unassociated stations set by setting an AID value to 2045. The trigger frame may contain the AID value set to 2045 to may allocate the one or more random RUs for use by all of the unassociated stations for uplink (UL) transmissions.

In other implementations, the first AP may be associated with a non-Tx BSSID, for example, such that the trigger frame is transmitted from the non-Tx BSSID. When the trigger frame is transmitted from a non-Tx BSSID, the TA of the trigger frame is set to the BSSID index of the non-Tx BSSID. The allocation of random access resources may include allocating one or more random RUs for use by stations associated with the non-Tx BSSID by setting an AID value to zero. The trigger frame may contain the AID value set to zero to allocate the one or more random RUs for use by stations associated with the non-Tx BSSID for UL transmissions. In addition, or in the alternative, the allocation of random access resources may include allocating one or more random resource units (RUs) to all unassociated stations set by setting an AID value to 2045. The trigger frame may contain the AID value set to 2045 to may allocate the one or more random RUs to all of the unassociated stations for UL transmissions.

In some implementations, the management frame may include a multiple BSSID element indicating that the first AP operates the multiple BSSID set and is associated with the Tx BSSID. The multiple BSSID element may also indicate a BSSID index for the first AP and a BSSID index for each of the number of other APs. In addition, or in the alternative, the management frame may include a random access parameter (RAPS) element indicating orthogonal frequency-division multiple access (OFDMA) contention window values for stations associated with the first AP. The management frame may also include, for each of the number of other APs, a corresponding RAPS element indicating OFDMA contention window values for stations associated with the respective one of the other APs.

Another innovative aspect of the subject matter described in this disclosure can be implemented in a first access point (AP) to allocate wireless resources to a multiple basic service set identifier (BSSID) set including a transmitted BSSID (Tx BSSID) and a number of non-transmitted BSSIDs (non-Tx BSSIDs). The Tx BSSID may be associated with the first AP, and each of the non-Tx BSSIDs may be associated with a corresponding one of a number of other APs. In some implementations, the first AP may include one or more processors and a memory. The memory can store instructions that, when executed by the one or more processors, cause the first AP to allocate random access resources for use by stations belonging to the multiple BSSID set using a number of association identifier (AID) values based on a group AID mapping contained in a partial virtual bitmap of a traffic indication map (TIM) element; and to transmit a trigger frame containing the number of AID values to the stations belonging to the multiple BSSID set. Execution of the instructions may also cause the first AP to transmit a management frame including the partial virtual bitmap containing the group AID mapping.

Another innovative aspect of the subject matter described in this disclosure can be implemented in a non-transitory computer-readable medium. The non-transitory computer-readable medium can store instructions that, when executed by one or more processors of a first access point (AP), causes the first AP to allocate wireless resources to a multiple basic service set identifier (BSSID) set including a transmitted BSSID (Tx BSSID) and a number of non-transmitted BSSIDs (non-Tx BSSIDs). The Tx BSSID may be associated with the first AP, and each of the non-Tx BSSIDs may be associated with a corresponding one of a number of other APs. In some implementations, execution of the instructions may cause the first AP to perform a number of operations including: allocating random access resources for use by stations belonging to the multiple BSSID set using a number of association identifier (AID) values based on a group AID mapping contained in a partial virtual bitmap of a traffic indication map (TIM) element, and may include transmitting a trigger frame containing the number of AID values to the stations belonging to the multiple BSSID set, wherein the Tx BSSID is associated with the first AP and each of the non-Tx BSSIDs is associated with a corresponding one of a number of other APs.

Another innovative aspect of the subject matter described in this disclosure can be implemented in a first access point (AP) to allocate wireless resources to a multiple basic service set identifier (BSSID) set including a transmitted BSSID (Tx BSSID) and a number of non-transmitted BSSIDs (non-Tx BSSIDs). The Tx BSSID may be associated with the first AP, and each of the non-Tx BSSIDs may be associated with a corresponding one of a number of other APs. In some implementations, the first AP may include means for allocating random access resources for use by stations belonging to the multiple BSSID set using a number of association identifier (AID) values based on a group AID mapping contained in a partial virtual bitmap of a traffic indication map (TIM) element; and means for transmitting a trigger frame containing the number of AID values to the stations belonging to the multiple BSSID set.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numerals refer to corresponding parts throughout the drawing figures.

DETAILED DESCRIPTION

Figure 1A:
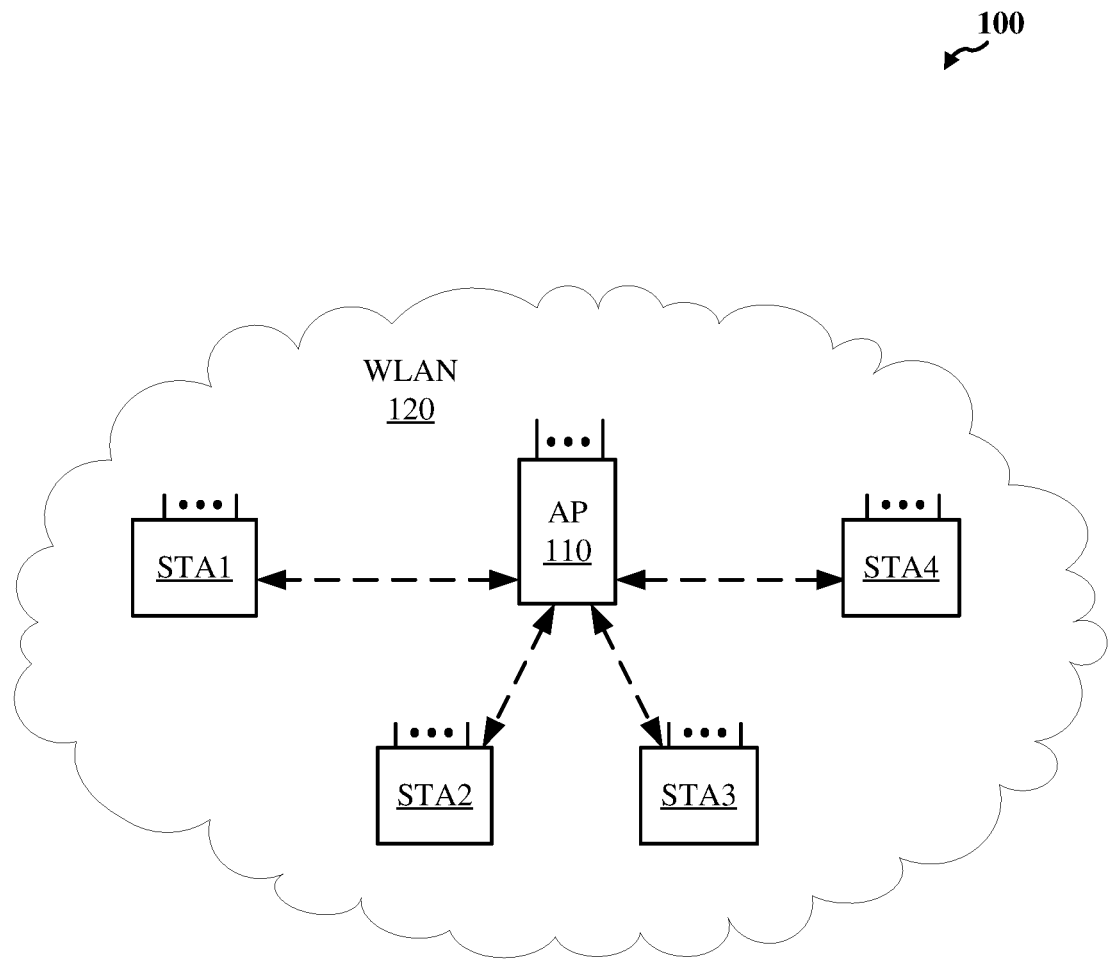
FIG. 1A shows a block diagram of a wireless system within which aspects of the present disclosure may be implemented.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A multiple basic service set identification (BSSID) set may include a plurality of basic service set (BSSs) each associated with or operated by a corresponding access point (AP) or virtual access point. All APs belonging to a multiple BSSID set all use a common operating class, a common channel, a common channel access mechanisms, and a common antenna connector. Further, the BSSIDs assigned to the APs belonging to the multiple BSSID share the same 48-n MSBs, and the BSSIDs assigned to the APs are not available as MAC addresses for stations using a different operating class, channel or antenna connector. In a multiple BSSID set, one of the APs and its associated BSS may be designated as the transmitted BSSID (or the "Tx BSSID"), and the other APs and their associated BSSs may be designated as "non-transmitted BSSIDs" (or the "non-Tx BSSIDs"). Thus, the terms "transmitted BSSID" and "Tx BSSID" may be used interchangeably herein, and the terms "non-transmitted BSSID" and "non-Tx BSSID" may be used interchangeably herein.

Implementations of the subject matter described in this disclosure may be used to prioritize the allocation of resource units (RUs) between basic service sets (BSSs) in a multiple BSSID set. In some implementations, an access point (AP) may prioritize the allocation of random RUs to each of a plurality of BSSs based on at least one of the number of STAs associated with each of the BSSs, traffic types in each of the BSSs, priority levels of traffic flows in each of the BSSs, security parameters associated with each of the BSSs, access privileges of wireless devices belonging to each of the BSSs, types of wireless devices belonging to each of the BSSs, quality of service (QoS) parameters associated with each of the BSSs, delay or latency requirements of wireless devices belonging to each of the BSSs, and any other suitable factors or parameters.

Particular implementations of the subject matter described in this disclosure can be implemented to realize one or more of the following potential advantages. The ability to allocate random RUs to one or more selected BSSs or to STAs associated with one or more specific BSSs (such as rather than allocating random RUs to all BSSs controlled or operated by the AP) may increase the utilization and efficiency of a wireless medium shared by the BSSs. For one example, if a first BSS includes 100 wireless devices and a second BSS includes 3 wireless devices, then the AP may allocate more random RUs to the first BSS, for example, because more wireless devices belong to the first BSS than to the second BSS—and therefore the first BSS is likely to have a greater amount of wireless traffic than the second BSS. In this manner, the AP may ensure that the 3 wireless devices belonging to the second BSS do not receive a disproportionate share of the random RUs associated with the shared wireless medium (such as compared with conventional resource allocation techniques that allocate equal amounts of random RUs to the first and second BSSs). For another example, if a first BSS includes 4 smartphones that may frequently facilitate VoIP calls (or other high-priority traffic) and a second BSS includes 10 smart sensors typically associated with low-priority traffic, then the AP may allocate more random RUs to the first BSS, for example, because the 4 smartphones belonging to the first BSS have higher traffic classes and smaller latency tolerances than the 10 smart sensors belonging to the second BSS. In some implementations, aspects of the present disclosure may be used to coordinate the allocation of random RUs to different BSSs of a multiple BSSID set in a manner that may increase the fairness with which all of devices (such as STAs) belonging to a multiple BSSID set may contend with each other for access to the random RUs.

As used herein, the term "associated STA" refers to a STA that is associated with a given AP, and the term "non-associated STA" refers to a STA that is not associated with the given AP. In addition, as used herein, the term "directed trigger frame" may refer to a trigger frame that directs each of a number of STAs identified in the trigger frame to transmit uplink (UL) multi-user (MU) data on a resource unit allocated to the STA, and the term "random trigger frame" may refer to a trigger frame that allows any receiving STA to transmit UL MU data on one or more shared resource units indicated in the trigger frame. Further, a Random Access Parameter Set (RAPS) element may also be referred to as UL OFDMA-based Random Access (UORA) Parameter Set element. Thus, the terms RAPS element and UORA Parameter Set element may be used interchangeably herein.

FIG. 1A is a block diagram of a wireless system 100 within which aspects of the present disclosure may be implemented. The wireless system 100 is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1A for simplicity, it is to be understood that WLAN 120 may be formed by any number of access points such as AP 110. The AP 110 may be assigned a unique media access control (MAC) address that is programmed therein by, for example, the manufacturer of the access point. Similarly, each of stations STA1-STA4 may also be assigned a unique MAC address. In some aspects, the AP 110 may assign an association identification (AID) value to each of the stations STA1-STA4, for example, so that the AP 110 may identify the stations STA1-STA4 using their assigned AID values.

In some implementations, the WLAN 120 may allow for multiple-input multiple-output (MIMO) communications between the AP 110 and the stations STA1-STA4. The MIMO communications may include single-user MIMO (SU-MIMO) and multi-user MIMO (MU-MIMO) communications. In some aspects, the WLAN 120 may utilize a multiple channel access mechanism such as, for example, an orthogonal frequency-division multiple access (OFDMA) mechanism. Although the WLAN 120 is depicted in FIG. 1A as an infrastructure basic service set (BSS), in other implementations, the WLAN 120 may be an independent basic service set (IBSS), an ad-hoc network, or a peer-to-peer (P2P) network (such as operating according to the Wi-Fi Direct protocols).

Each of the stations STA1-STA4 may be any suitable wireless device including, for example, a cell phone, personal digital assistant (PDA), tablet device, laptop computer, or the like. Each of the stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some implementations, each of the stations STA1-STA4 may include one or more transceivers, one or more processing resources, one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described below with respect to FIGS. 7-8 and 11-13.

The AP 110 may be any suitable device that allows one or more wireless devices to connect to a network (such as a local area network (LAN), wide area network (WAN), metropolitan area network (MAN), or the Internet) via the AP 110 using wireless communications such as, for example, Wi-Fi, Bluetooth, and cellular communications. In some implementations, the AP 110 may include one or more transceivers, one or more processing resources, one or more memory resources, and a power source. The memory resources may include a non-transitory computer-readable medium (such as one or more nonvolatile memory elements, such as EPROM, EEPROM, Flash memory, a hard drive, etc.) that stores instructions for performing operations described below with respect to FIGS. 7-8 and 11-13.

For the stations STA1-STA4 and the AP 110, the one or more transceivers may include Wi-Fi transceivers, Bluetooth transceivers, cellular transceivers, and any other suitable radio frequency (RF) transceivers (not shown for simplicity) to transmit and receive wireless communication signals. Each transceiver may communicate with other wireless devices in distinct operating frequency bands, using distinct communication protocols, or both. For example, the Wi-Fi transceiver may communicate within a 900 MHz frequency band, a 2.4 GHz frequency band, a 5 GHz frequency band, and a 60 MHz frequency band in accordance with the IEEE 802.11 standards. The Bluetooth transceiver may communicate within the 2.4 GHz frequency band in accordance with the standards provided by the Bluetooth Special Interest Group (SIG), in accordance with the IEEE 802.15 standards, or both. The cellular transceiver may communicate within various RF frequency bands in accordance with any suitable cellular communications standard.

Figure 1B:
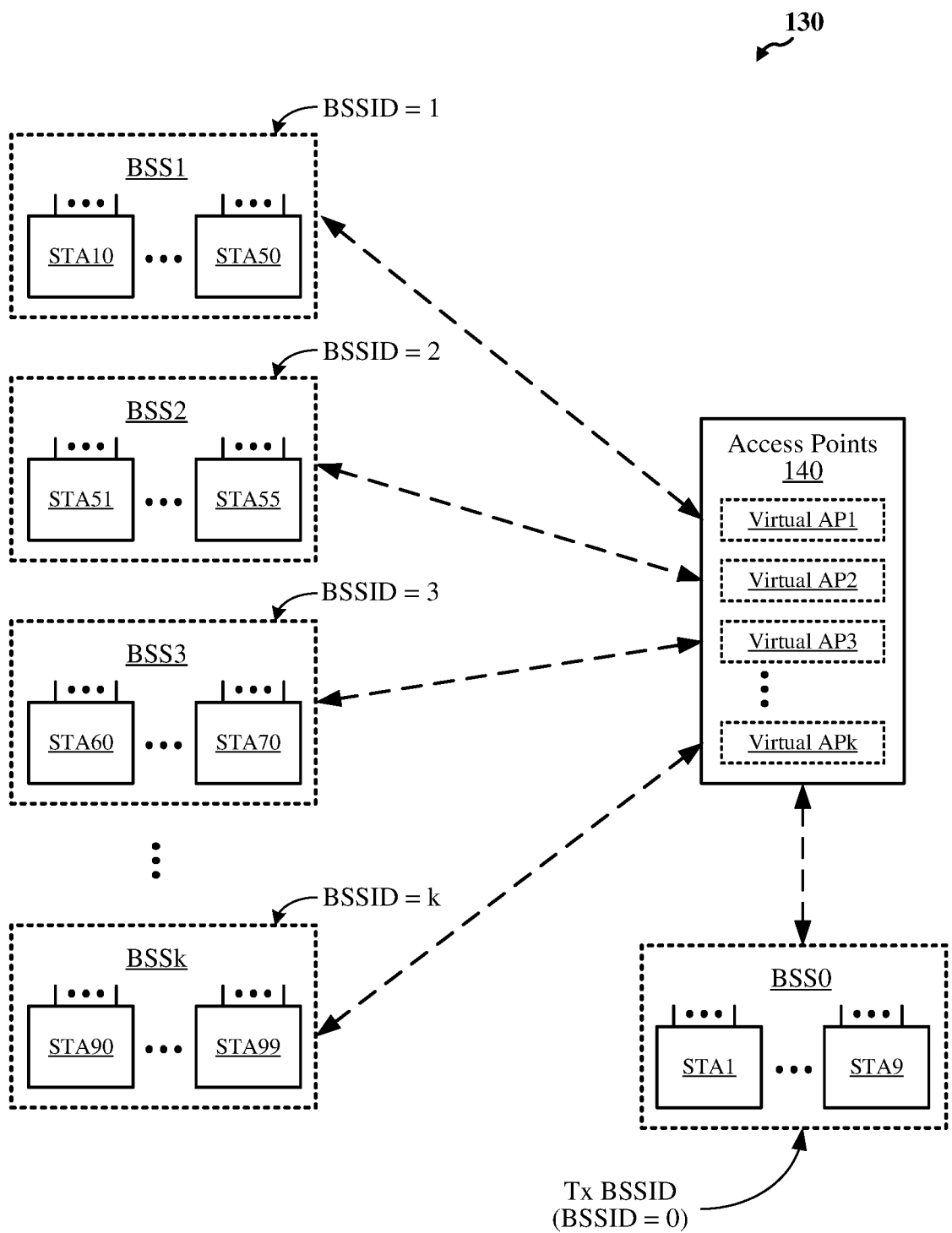
FIG. 1B shows a block diagram of another wireless system within which aspects of the present disclosure may be implemented.

FIG. 1B is a block diagram of an example multiple BSSID set 130 within which aspects of the present disclosure may be implemented. The multiple BSSID set 130 includes a plurality of basic service sets BSS0-BSSk, each associated with or operated by a corresponding access point 140 (or virtual access point) such as, for example, the AP 140. An AP may announce the existence of the multiple BSSID set 130 and identify the individual basic service sets BSS0-BSSk that belong to the multiple BSSID set 130 in a single management frame (such as a beacon frame or a probe response frame). In some implementations, the management frame may include a Multiple BSSID element to announce a multiple BSSID capability of the AP and the existence of multiple basic service sets (BSSs) operated or controlled by the AP. The multiple BSSID capability may indicate an ability to advertise information for multiple BSSIDs using a single beacon frame or a single probe response frame (rather than using multiple beacon frames or multiple probe response frames). In some implementations, the multiple BSSID capability may indicate the ability to use a single traffic indication map (TIM) element to indicate a presence of group address traffic for delivery to any of the basic service sets BSS0-BSSk belonging to the multiple BSSID set 130 and to indicate the presence of queued downlink (DL) data for one or more individual STAs regardless of which of the basic service sets BSS0-BSSk the individual STAs are associated with.

Each STA that receives the Multiple BSSID element may respond to the AP and indicate whether the STA is capable of supporting multiple BSSs. In some implementations, if a STA supports Multiple BSSID capabilities, then the STA can assert a corresponding bit in an Extended Capabilities IE that is transmitted to the AP in a frame or packet. In some aspects, the STA may provide the Extended Capabilities IE in a probe request (such as during active scanning operations). In other aspects, the STA may provide the Extended Capabilities IE in an association request (such as during passive scanning operations). If multiple BSSID capabilities are supported, then the AP may transmit beacon frames using any basic transmission rate that is supported by all of the BSSs associated with or controlled by the AP.

Each of the basic service sets BSS0-BSSk may be assigned a different BSSID index, for example, so that the AP and each of the sets of wireless stations STAs can distinguish between data transmissions corresponding to each of the different basic service sets BSS0-BSSk. In some implementations, the BSSID index assigned to each of the basic service sets BSS0-BSSk may be a unique identifier (such as a unique 48-bit identifier). In some aspects, the BSSID indices may be used as filtering addresses, for example, so that only the wireless stations STAs associated with a given BSS may receive and decode frames or packets intended for reception by wireless devices belonging to or associated with the given BSS.

For purposes of discussion herein, the basic service set BSS0 is designated as the Tx BSSID, and may transmit management frames containing the Multiple BSSID element. The other basic service sets BSS1-BSSk are designated as the non-Tx BSSIDs, and do not transmit management frames containing the Multiple BSSID element. In some implementations, the Tx BSSID is assigned a BSSID index=0, and may be used as a reference index upon which the BSSID indices of the non-Tx BSSIDs are based. For example, the basic service set BSS1 may be assigned a BSSID index=1, the basic service set BSS2 may be BSSID index=2, the basic service set BSS3 may be assigned a BSSID index=3, and so on, and the basic service set BSSk may be assigned a BSSID index=k. Using a range of index values between 0 and k to identify each of the BSSIDs in the multiple BSSID set 130 may allow a TIM element in a management frame to indicate a presence of group address traffic for each of the BSSIDs in the multiple BSSID set 130, as described in more detail below with respect to FIG. 2E.

For the example multiple BSSID set 130 of FIG. 1B, the Tx BSSID (corresponding to the basic service set BSS0) is shown to include associated stations STA1-STA9, the first non-Tx BSSID (corresponding to the basic service set BSS1) is shown to include associated stations STA10-

STA50, the second non-Tx BSSID (corresponding to the basic service set BSS2) is shown to include associated stations STA51-STA55, the third non-Tx BSSID (corresponding to the basic service set BSS3) is shown to include associated stations STA60-STA70, and so on, where the kV non-Tx BSSID (corresponding to the basic service set BSSk) is shown to include associated stations STA90-STA99. In other example implementations, each of the basic service sets BSS0-BSSk may include other suitable numbers of stations.

An AP (such as the AP 140) may assign a unique AID value to each of the stations STA1-STA99 belonging to the multiple BSSID set 130, for example, so that each of the stations STA1-STA99 can be individually identified and addressed by TIM elements that indicate a presence of buffered downlink (DL) data and by trigger frames that allocate resource units (RUs) for the transmission of uplink (UL) data. In some implementations, a certain number of AID values may be reserved for indicating the presence of group address traffic for the BSSIDs in the multiple BSSID set 130, and may not be assigned to any of the stations STA1-STA99.

A trigger frame may contain one or more User Info fields (UIFs). In some implementations, a trigger frame transmitted by an AP may include multiple UIFs. Each of the UIFs may assign a resource unit (RU) upon which a recipient STA can use to transmit uplink (UL) traffic to the AP. In some implementations, each UIF may include an AID12 subfield that contains the AID of the STA to which a corresponding RU is allocated. In some aspects, only the STA identified by the AID value in the UIF may transmit UL data on the allocated RU (hereinafter denoted as a dedicated RU). In addition, or in the alternative, the AID in a UIF of a trigger frame may be set to a special value that allows the allocated RUs to be shared by multiple STAs. These shared RUs may be referred to as random RUs. For one example, the AID may be set to zero (0) to allocate random RUs to a group of associated STAs that have not been allocated any dedicated RUs. For another example, the AID may be set to the value 2045 to allocate random RUs to all unassociated STAs.

As depicted in the example of FIG. 1B, the AP 140 may operate the basic service sets BSS1-BSSk associated with the non-Tx BSSIDs using a corresponding number of virtual access points VAP1-VAPk. Each of the virtual access points VAP1-VAPk may manage a corresponding one of the basic service sets BSS1-BSSk, respectively, and may operate in a manner similar to a stand-alone access point. Although the virtual access points VAP1-VAPk may be physically contained or integrated within a single access point or device (such as the AP 140), each of the virtual access points VAP1-VAPk may use (or be assigned) a different transmitter address (TA) when transmitting frames to STAs belonging to a corresponding one of the BSSs, and may use (or be assigned) a different receiver address (RA) when receiving frames from STAs belonging to a corresponding one of the BSSs. In this manner, the various stations STA1-STA99 belonging to the multiple BSSID set 130 can distinguish between the Tx BSSID and the non-Tx BSSIDs corresponding to the different basic service sets BSS0-BSSk, respectively, when transmitting and receiving data. Assigning a different TA and a different RA to each of the virtual access points VAP1-VAPk may also allow a new station (such as a station not yet associated with any AP) to identify the existence of the multiple BSSID set 130 and to identify each of the basic service sets BSS0-BSSk that belong to the multiple BSSID set 130.

The Multiple BSSID element also may allow an AP to indicate the presence of group address traffic for the Tx BSSID, to indicate the presence of group address traffic for each of the non-Tx BSSIDs, and to indicate the presence of queued downlink (DL) data for STAs associated with any of the different BSSs belonging to the multiple BSSID set 130 (irrespective of whether the STAs are associated with the Tx BSSID or one of the non-Tx BSSIDs) using a single traffic indication map (TIM) element. The TIM element may be transmitted in a single management frame (such as a beacon frame or a probe response frame). In some implementations, mappings between bits contained in a partial virtual bitmap included in the TIM element and AID values corresponding to the stations STA1-STA99 and the BSSIDs in the multiple BSSID set 130 may be used by trigger frames disclosed herein to allocate not only dedicated resource units (RUs) to the stations STA1-STA99 in the multiple BSSID set 130 but also random RUs to one or more specific BBSIDs in the multiple BSSID set. The allocation of dedicated RUs and/or random RUs in trigger frames is described in more detail below with respect to FIGS. 8 and 11-12.

Figure 2A:
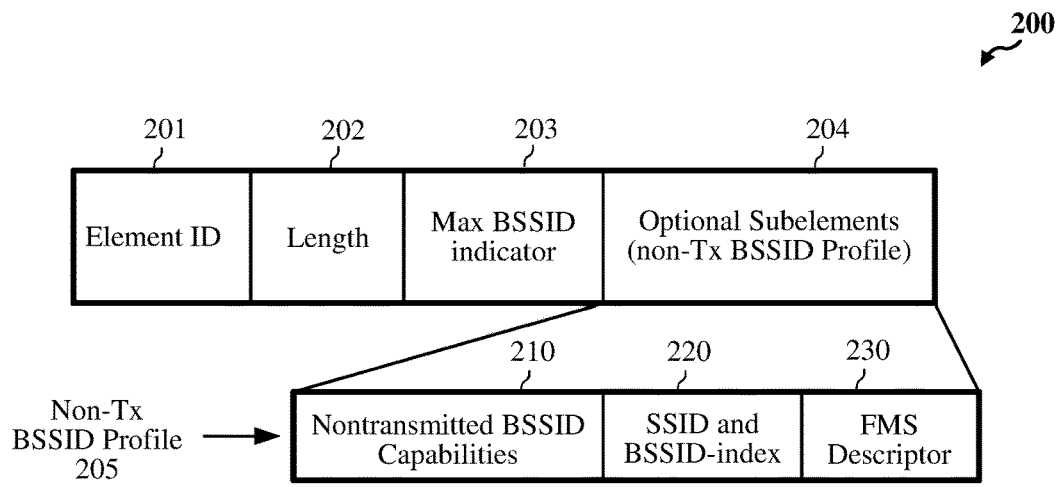
FIG. 2A shows an example multiple Basic Service Set Identification (BSSID) element.

FIG. 2A shows an example Multiple BSSID element 200. The Multiple BSSID element 200, which may be used by an AP to indicate that the AP belongs to a Multiple BSSID set (such as the multiple BSSID set 130 including the basic service sets BSS0-BSSk of FIG. 1B), is shown to include an element ID field 201, a length field 202, a MaxBSSID Indicator field 203, and an optional Sub-elements field 204. The element ID field 201 may store a value indicating the element type (such as a Multiple BSSID element). The length field 202 may store a value indicating a length of the Multiple BSSID element 200. The MaxBSSID Indicator field 203 may store a value indicating the maximum possible number of BSSIDs in the multiple BSSID set. In some aspects, the actual number of BSSIDs in the multiple BSSID set may not be explicitly signaled. The MaxBSSID Indicator field 203 may store a value of "n" to indicate a maximum number $2^n$ of BSSIDs supported by the AP. In some aspects, a management frame (such as a beacon frame or a probe response frame) may include more than one Multiple BSSID element 210.

In some implementations, the BSSID index of the Tx BSSID may be designated as the reference BSSID index, and the BSSID indices of the other non-Tx BSSIDs may be based on (or indexed relative to) the reference BSSID index. In some aspects, the BSSID(i) index corresponding to the $i^{th}$ BSSID in the multiple BSSID set may be derived from the reference BSSID (BSSID_REF) index as shown below:

BSSID(i)=BSSID_A|BSSID_B, where BSSID_A is a BSSID index with (48-n) MSBs equal to the (48-n) MSBs of the reference BSSID index and n LSBs equal to 0; BSSID_B is a BSSID index with (48-n) MSBs equal to 0 and n LSBs equal to [(n LSBs of REF_BSSID)+i] mod $2^n$. In these implementations, when the Multiple BSSID element 200 is transmitted in a beacon frame or in a probe response frame, the BSSID index of the frame is set to the reference BSSID index (such as the BSSID index of the AP that transmitted the beacon frame).

The optional Sub-elements field 204 may store zero or more additional sub-elements. For the example of FIG. 2A, the Sub-elements field 204 is shown to include a non-Tx BSSID profile 205. The non-Tx BSSID profile 205 may contain a list of elements for one or more APs (or virtual APs) associated with the non-Tx BSSIDs. In some aspects, the non-Tx BSSID profile 205 may contain at least a non-Tx BSSID capabilities element 210, an SSID and BSSID-index element 220, and an FMS descriptor element 230. The non-Tx BSSID capabilities element 210, the SSID and BSSID-index element 220, and the FMS descriptor element 230 are described below with respect to FIGS. 2B, 2C, and 2D, respectively.

Figure 2B:
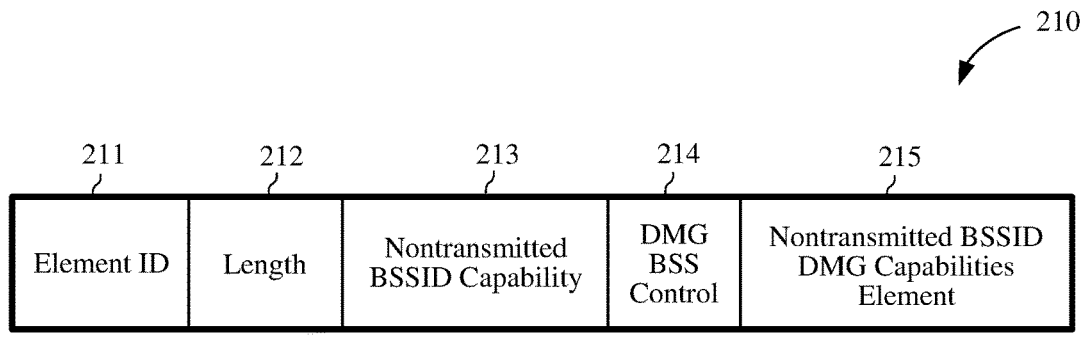
FIG. 2B shows an example non-transmitted Basic Service Set Identification (BSSID) capabilities element.

FIG. 2B shows an example non-Tx BSSID capabilities element 210. The non-Tx BSSID capabilities element 210 may be used by the Tx BSSID to advertise its support of multiple BSSs (such as the basic service sets BSS0-BSSk). In some implementations, the non-Tx BSSID capabilities element 210 may be included in all beacon frames broadcast by the Tx BSSID. In other implementations, the non-Tx BSSID capabilities element 210 may be included in selected beacon frames broadcast by the Tx BSSID. The non-Tx BSSID capabilities element 210 is shown to include an element ID field 211, a length field 212, a non-Tx BSSID capability field 213, a Directional Multi-Gigabit (DMG) BSS control field 214, and a non-Tx BSSID DMG capabilities field 215. The element ID field 211 may store a value indicating the element type (such as a non-Tx BSSID capabilities element). The length field 212 may store a value indicating a length of the Multiple BSSID capability element 200.

The non-Tx BSSID Capability field 213 includes the contents of the Capability Information field in beacons for the BSS when transmitted by a non-DMG STA. The DMG BSS Control field 214 and the non-Tx BSSID DMG Capabilities Element 215 may not be present when the transmitting device is a non-DMG STA.

Figure 2C:
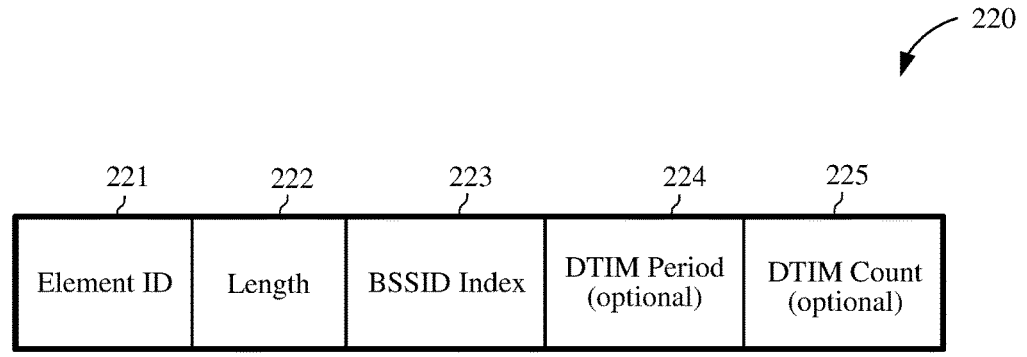
FIG. 2C shows an example multiple BSSID-index element.

FIG. 2C shows an example Multiple BSSID-index element 220. The Multiple BSSID-index element 220, which may be included in the Multiple BSSID element and used by the Tx BSSID to identify a corresponding non-Tx BSSID and its DTIM parameters, is shown to include an element ID field 221, a length field 222, a BSSID index 223, an optional delayed traffic indication map (DTIM) period 224, and an optional DTIM count 225. The element ID field 221 may store a value indicating the element type (such as a Multiple BSSID-index element). The length field 222 may store a value indicating a length of the Multiple BSSID-index IE 220. The BSSID Index field 223 may store a value between 1 and $2^n-1$ that identifies the corresponding non-Tx BSSID, where n is a nonzero, positive integer value indicating the number of bits in the BSSID index (and $2^n$ indicates the maximum number of supported BSSIDs). In some aspects, one or more of the index values may not be active, in which case the multiple BSSID-Index element 220 may indicate which of the index values are active. The DTIM period field 224 indicates the DTIM period for the BSSID, for example, by storing a value indicating how many beacon intervals occur between DTIM beacon frame transmissions. The DTIM count field 225 indicates the number of beacon intervals remaining until the next DTIM beacon frame is broadcast for the BSSID.

In some implementations, the Multiple BSSID-index element 220 may include both the DTIM Period field 224 and the DTIM count field 225 when transmitted in a beacon frame, and the Multiple BSSID-index element 220 may not include either the DTIM Period field 224 or the DTIM count field 225 when transmitted in a probe response frame. In other implementations, the Multiple BSSID-index element 220 may include either the DTIM Period field 224 or the DTIM count field 225 when transmitted in a probe response frame.

In some implementations, the SSID may be provided in all beacon frames, while the FMS Descriptor element may be provided in selected beacon frames based, for example, on whether the beacon frame's TIM element indicates the presence of queued DL data for STAs that are associated with one or more of the non-Tx BSSIDs. In some aspects, the FMS Descriptor element may be included in the non-Tx BSSID Profile subelement of a particular beacon frame if the beacon frame's TIM field indicates a presence of buffered group-addressed frames for the corresponding non-Tx BSSID. Conversely, the FMS Descriptor element may not be included in the non-Tx BSSID Profile subelement of a particular beacon frame if the beacon frame's TIM field does not indicate a presence of buffered group-addressed frames for the corresponding non-Tx BSSID.

Figure 2D:
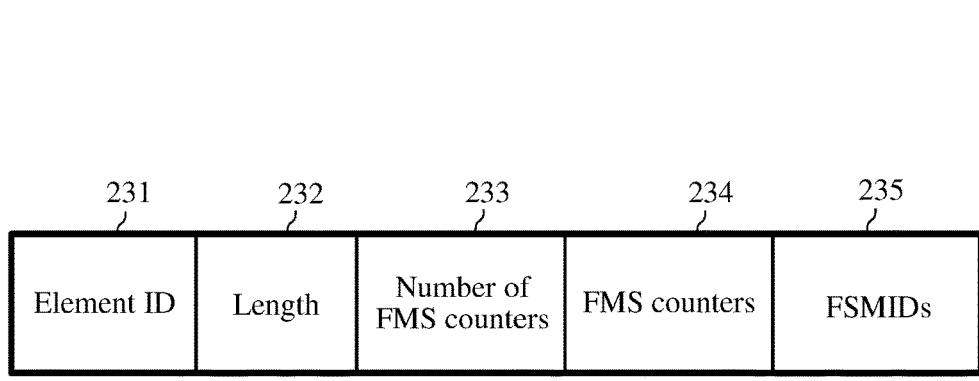
FIG. 2D shows an example Flexible Multicast Service (FMS) descriptor element.

FIG. 2D shows an example FMS descriptor element 230. The FMS descriptor element 230 may be used by the AP 110 to provide information about group addressed frames buffered in the Tx BSSID. The FMS descriptor element 230 may be included within beacon frames broadcast from the Tx BSSID. In some implementations, the FMS descriptor element 230 can be included in the non-Tx BSSID Profile subelement if the Multiple BSSID element is included in a beacon frame and if the TIM field indicates there are buffered group addressed frames for the non-Tx BSSID.

The FMS descriptor element 230 is shown to include an element ID field 231, a length field 232, a number of FSM counters field 233, an FMS counters field 234, and an FSMIDs field 235. The element ID field 231 may store a value indicating the element type (such as a FMS descriptor element). The length field 232 may store a value indicating a length of the FMS descriptor element 230. If no FMS streams are accepted by the Tx BSSID, then the length may be set to zero. Otherwise, the length may be set to a value=1+m+n, where "n" is an integer indicating the number of FMS counters and "m" is an integer indicating the number of FMSIDs present in the FMS descriptor IE 230. The number of FSM counters field 233 may store a value indicating the number of FMS counters contained in the FMS descriptor IE 230. A presence of the FSMIDs field 235 in the FMS descriptor element 230 may indicate that the Tx BSSID has buffered downlink data scheduled for delivery to the addressed group immediately after transmission of the next DTIM beacon frame.

In some implementations, the Tx BSSID may provide a partial list of non-Tx BSSID profiles in beacon frames when advertising non-Tx BSSID profiles. In other implementations, the Tx BSSID may provide different sets of non-Tx BSSID profiles in different beacon frames when advertising non-Tx BSSID profiles. Similarly, in some implementations, the Tx BSSID may provide a partial list of non-Tx BSSID profiles in probe response frames, and in other implementations may provide different sets of non-Tx BSSID profiles in different probe response frames. In some aspects, a STA may receive all of the BSSID profiles from previously received beacon frames (or probe response frames). In other aspects, a STA may obtain all of the BSSID profiles by transmitting a probe request frame to the AP associated with Tx BSSID, which in turn may provide the BSSID profiles to the STA in one or more probe response frames.

Figure 2E:
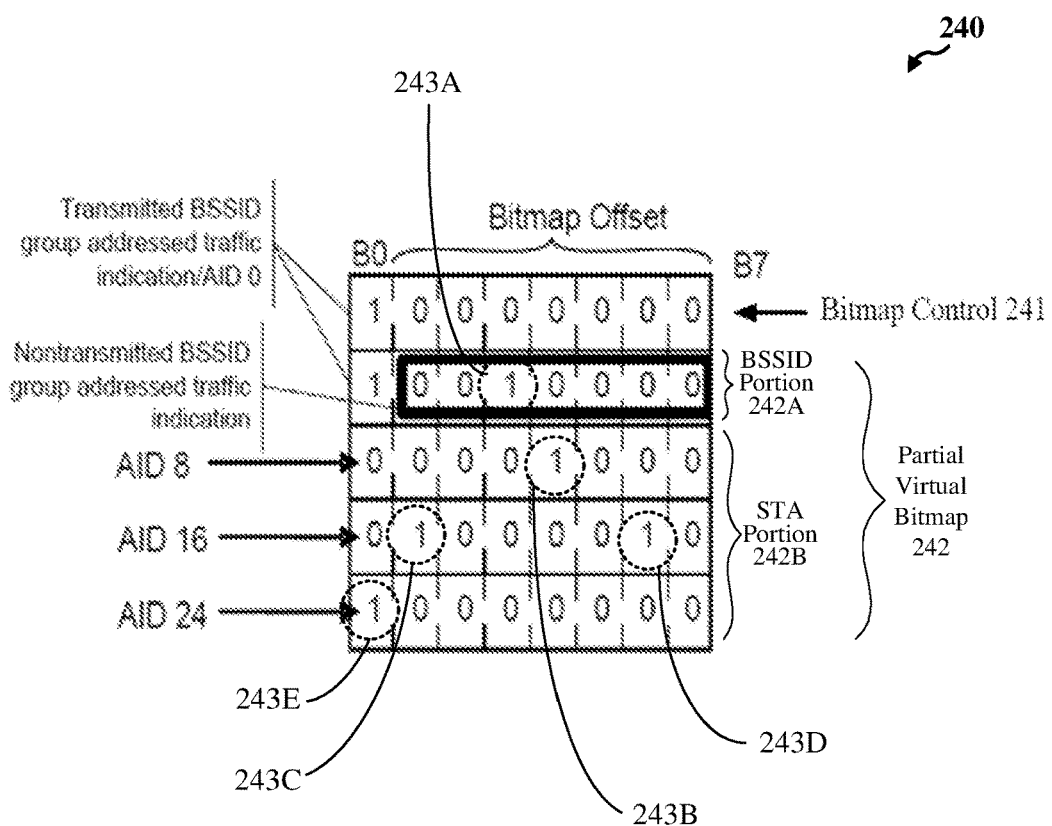
FIG. 2E shows an example partial virtual bitmap field.

FIG. 2E shows a portion 240 of a TIM element including an example bitmap control field 241 and an example partial virtual bitmap 242. In some implementations, the portion 240 includes a number of octets of the traffic indication virtual bitmap of the TIM element of a management frame transmitted from a Tx BSSID. The maximum possible number of supported BSSIDs may be denoted as $2^n$, and an integer "k" may indicate the number of non-Tx BSSIDs supported by the AP, where $k \leq (2^n-1)$. The group AID mapping (which may also be referred to as the group-address AID mapping) in the TIM element of a management frame may be referenced to (or indexed from) the AP that transmitted the beacon frame. In some implementations, the group AID mapping in the TIM element may also be used in trigger frames to allocate dedicated RUs to specific STAs and/or random RUs to individual basic service sets (such as one or more selected BSSIDs belonging to a multiple BSSID set), as described in more detail below with respect to FIGS. 8 and 11-12.

For the example of FIG. 2E, the bitmap control field 241 includes $2^n=2^3=8$ bits (denoted by bit positions B0-B7), and may be used for a multiple BSSID set including up to eight BSSIDs. Bit B0 of the bitmap control field 241 contains the traffic indication virtual bitmap bit associated with the Tx BSSID, and the remaining 7 bits of the bitmap control field 241 form the bitmap offset. The bitmap offset may be used to identify the BSSID index assigned to each of the non-Tx BSSIDs relative to the BSSID index of the Tx BSSID. For example, the Tx BSSID may be assigned a BSSID index=0, a first non-Tx BSSID may be assigned a BSSID index=1, a second non-Tx BSSID may be assigned a BSSID index=2, and so on. In some aspects, bits B0-B7 of the bitmap control field 241 correspond to AID values 0 through 8, respectively, such that the Tx BSSID may be identified by an AID=0, the first non-Tx BSSID may be identified by an AID=1, the second non-Tx BSSID may be identified by an AID=2, and so on. In this manner, the bitmap control field 241 may provide a mapping between BSSID index values and AID values. Further, because AID values 0 through 7 are assigned to the eight BSSIDs in the multiple BSSID set, an AID=8 is the lowest possible AID value that can be assigned to a STA belonging to the multiple BSSID set.

In some implementations, the partial virtual bitmap 242 may be described as including a BSSID portion 242A and a STA portion 242B. For the example of FIG. 2E, the BSSID portion 242A includes eight bits (denoted by bit positions B0-B7) that may indicate a presence of group address traffic for a corresponding one of the eight supported BSSIDs. In some aspects, bit B0 of the BSSID portion 242A may indicate a presence of group address traffic for stations associated with the Tx BSSID, and the bits B1-B7 may indicate a presence of group address traffic for a corresponding one of the seven non-Tx BSSIDs. More specifically, referring also to the multiple BSSID set 130 of FIG. 1B, bit B0 may indicate whether the AP corresponding to the Tx BSSID (having a BSSID index=0 and AID=0) has queued multicast DL data for its associated stations, bit B1 may indicate whether the AP (or the virtual AP) corresponding to the non-Tx BSSID having a BSSID index=1 and AID=1 has queued multicast DL data for its associated, bit B2 may indicate whether the AP (or the virtual AP) corresponding to the non-Tx BSSID having a BSSID index=2 and AID=2 has queued multicast DL data its associated stations, bit B3 may indicate whether the AP (or the virtual AP) corresponding to the non-Tx BSSID having a BSSID index=3 and AID=3 has queued multicast DL data for its associated stations, and so on.

When the DTIM Count field in a management frame has a value equal to zero for a BSS that includes a non-Tx BSSID, and one or more group addressed frames are buffered at the AP for the Tx BSSID, bits B1 through B7 in the BSSID portion 242A of the partial virtual bitmap 242 may each be set to 1 to indicate the presence of queued multicast downlink (DL) data for each of the corresponding non-Tx BSSIDs. For the example of FIG. 2E, bit B3 in the BSSID portion 242A (denoted by reference circle 243A) is set to 1 to indicate that the non-Tx BSSID having a BSSID index=3 has queued DL multicast data to be delivered.

For the example of FIG. 2E, the STA portion 242B includes bits beginning at position $2^n=8$ of the partial virtual bitmap 242 (which also corresponds to an AID=8). Each of the bits in the STA portion 242B may be used to indicate a presence of queued DL data for an individual STA belonging to the multiple BSSID set. In some implementations, each of the bits in the STA portion 242B of the partial virtual bitmap 242 may correspond to the AID value assigned to a respective one of the STAs belonging to the multiple BSSID set, and therefore may be used to indicate a presence of queued DL data for the respective STA, regardless of whether the respective STA is associated with the Tx BSSID or is associated with one of the non-Tx BSSIDs. In this manner, the partial virtual bitmap 242 may be used to indicate a presence of queued DL data for any one or more STAs belonging to the multiple BSSID set 130.

For the example of FIG. 2E, the partial virtual bitmap 242 indicates that the AP has queued DL data for the STA having an AID value=12 (as denoted by reference circle 243B), has queued DL data for the STA having an AID value=17 (as denoted by reference circle 243C), has queued DL data for the STA having an AID value=22 (as denoted by reference circle 243D), and has queued DL data for the STA having an AID value=24 (as denoted by reference circle 243E).

In some implementations, a STA may determine whether any of the APs in the multiple BSSID set 130 has queued DL data for the STA by examining only two bits of a partial virtual bitmap 242 contained in a management frame: one of the two bits is an AID value in the BSSID portion 242A that indicates a presence of group address traffic for the BSSID associated with the STA, and the other of the two bits is an AID value in the STA portion 242B that indicates a presence of queued DL data for the STA in any of the APs belonging to the multiple BSSID set. For example, referring also to FIG. 1B, if a STA is associated with the non-Tx BSSID having a BSSID index=3 and has an assigned AID value=12, then the STA can examine the value stored in bit position B3 (corresponding to an AID value and BSSID index=3) in the BSSID portion 242A to determine whether its associated AP has group address traffic for its BSSID, and can examine the value stored in the STA portion 242B corresponding to the AID value=12 to determine whether any of the APs (or virtual APs) belonging to the multiple BSSID set 130 has DL data for the STA.

In this manner, any STA within a multiple BSSID set may be able to determine whether any of the APs belonging to the multiple BSSID set has DL data for the STA based on (1) the BSSID index of its associated AP and (2) its own AID value.

Figure 3:
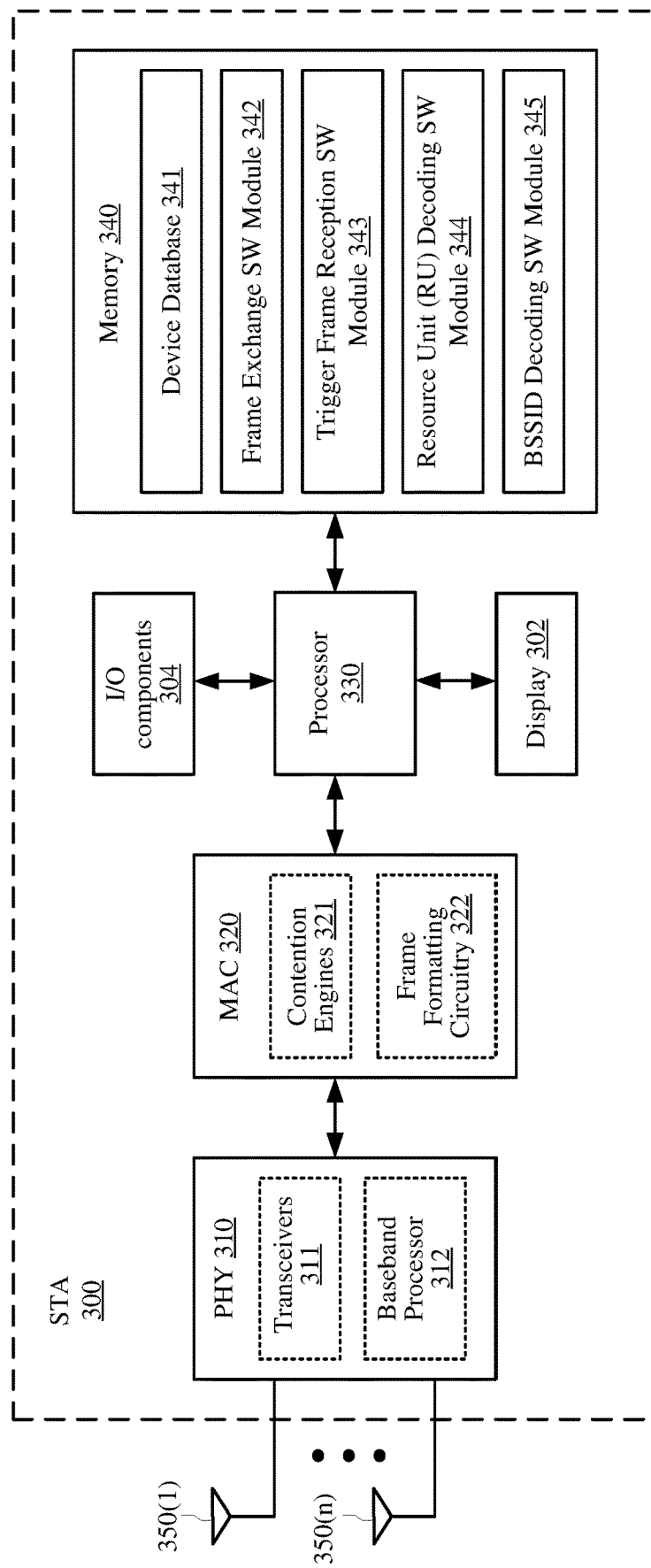
FIG. 3 shows a block diagram of an example wireless station.

FIG. 3 shows an example STA 300. In some implementations, the STA 300 may be one example of one or more of the wireless stations STA1-STA4 of FIG. 1A or one or more of the wireless stations STA1-STA99 of FIG. 1B. The STA 300 may include a display 302, input/output (I/O) components 304, a physical-layer device (PHY) 310, a medium access controller (MAC) 320, a processor 330, a memory 340, and a number of antennas 350(1)-350(n). The display 302 may be any suitable display or screen upon which items may be presented to a user (such as for viewing, reading, or watching). In some aspects, the display 302 may be a touch-sensitive display that allows for user interaction with the STA 300 and that allows the user to control one or more operations of the STA 300. The I/O components 304 may be or include any suitable mechanism, interface, or device to receive input (such as commands) from the user and to provide output to the user. For example, the I/O components 304 may include (but are not limited to) a graphical user interface, keyboard, mouse, microphone, speakers, and so on.

The PHY 310 may include at least a number of transceivers 311 and a baseband processor 312. The transceivers 311 may be coupled to the antennas 350(1)-350(n), either directly or through an antenna selection circuit (not shown for simplicity). The transceivers 311 may be used to transmit signals to and receive signals from the AP 110 and other STAs (see also FIGS. 1A and 1B), and may be used to scan the surrounding environment to detect and identify nearby access points and other STAs (such as within wireless range of the STA 300). Although not shown in FIG. 3 for simplicity, the transceivers 311 may include any number of transmit chains to process and transmit signals to other wireless devices via the antennas 350(1)-350(n), and may include any number of receive chains to process signals received from the antennas 350(1)-350(n). In some implementations, the STA 300 may be configured for MIMO operations. The MIMO operations may include SU-MIMO operations and MU-MIMO operations. The STA 300 also may be configured for OFDMA communications and other suitable multiple access mechanisms, for example, as may be provided for in the IEEE 802.11ax standards.

The baseband processor 312 may be used to process signals received from the processor 330 or the memory 340 (or both) and to forward the processed signals to the transceivers 311 for transmission via one or more of the antennas 350(1)-350(n), and may be used to process signals received from one or more of the antennas 350(1)-350(n) via the transceivers 311 and to forward the processed signals to the processor 330 or the memory 340 (or both).

The MAC 320 may include at least a number of contention engines 321 and frame formatting circuitry 322. The contention engines 321 may contend for access to one more shared wireless mediums, and may also store packets for transmission over the one more shared wireless mediums. The STA 300 may include one or more contention engines 321 for each of a plurality of different access categories. In other implementations, the contention engines 321 may be separate from the MAC 320. For still other implementations, the contention engines 321 may be implemented as one or more software modules (such as stored in memory 340 or stored in memory provided within the MAC 320) containing instructions that, when executed by the processor 330, perform the functions of the contention engines 321.

The frame formatting circuitry 322 may be used to create and format frames received from the processor 330 (such as by adding MAC headers to PDUs provided by the processor 330), and may be used to re-format frames received from the PHY 310 (such as by stripping MAC headers from frames received from the PHY 310). Although the example of FIG. 3 depicts the MAC 320 coupled to the memory 340 via the processor 330, in other implementations, the PHY 310, the MAC 320, the processor 330, and the memory 340 may be connected using one or more buses (not shown for simplicity).

The processor 330 may be any suitable one or more processors capable of executing scripts or instructions of one or more software programs stored in the STA 300 (such as within the memory 340). In some implementations, the processor 330 may be or include one or more microprocessors providing the processor functionality and external memory providing at least a portion of machine-readable media. In other implementations, the processor 330 may be or include an Application Specific Integrated Circuit (ASIC) with the processor, the bus interface, the user interface, and at least a portion of the machine-readable media integrated into a single chip. In some other implementations, the processor 330 may be or include one or more Field Programmable Gate Arrays (FPGAs) or Programmable Logic Devices (PLDs).

The memory 340 may include a device database 341 that stores profile information for the STA 300 and for a number of other wireless devices such as APs and other STAs. The profile information for the STA 300 may include, for example, its MAC address, its assigned AID value, the BSSID of the basic service set to which the STA 300 belongs, bandwidth capabilities, supported channel access mechanisms, supported data rates, and so on. The profile information for a particular AP may include, for example, the AP's BSSID index, an indication that the AP corresponds to the Tx BSSID or to one of the non-Tx BSSIDs, MAC address, channel information, received signal strength indicator (RSSI) values, goodput values, channel state information (CSI), supported data rates, connection history with the AP, a trustworthiness value of the AP (such as indicating a level of confidence about the AP's location, etc.), and any other suitable information pertaining to or describing the operation of the AP.

The memory 340 may also include a non-transitory computer-readable medium (such as one or more nonvolatile memory elements, such as EPROM, EEPROM, Flash memory, a hard drive, and so on) that may store at least the following software (SW) modules:

a frame exchange software module 342 to facilitate the creation and exchange of any suitable frames (such as data frames, action frames, control frames, and management frames) between the STA 300 and other wireless devices, for example, as described below for one or more operations of FIGS. 7-8 and 11-13;

a trigger frame reception software module 343 to receive trigger frames, to determine whether the trigger frames solicit a response from the STA 300, to determine whether the trigger frames allocate any dedicated RUs to the STA 300, and to determine whether the trigger frames allocate any random RUs that may be used by the STA 300, for example, as described below for one or more operations of FIGS. 7-8 and 11-13;

a resource unit (RU) decoding software module 344 to determine which (if any) dedicated RUs are allocated to the STA 300, to determine which (if any) random RUs are allocated for use by the STA 300, and to determine the size, location, and other parameters of any allocated RUs, for example, as described below for one or more operations of FIGS. 7-8 and 11-13; and a BSSID decoding software module 345 to determine the multiple BSSID capabilities of one or more APs and to determine whether one or more APs associated with a multiple BSSID set have queued DL traffic for the STA 300, for example, as described below for one or more operations of FIGS. 7-8 and 11-13.

Each software module includes instructions that, when executed by the processor 330, cause the STA 300 to perform the corresponding functions. The non-transitory computer-readable medium of the memory 340 thus includes instructions for performing all or a portion of the operations described below with respect to FIGS. 7-8 and 11-13.

The processor 330 may execute the frame exchange software module 342 to facilitate the creation and exchange of any suitable frames (such as data frames, action frames, control frames, and management frames) between the STA 300 and other wireless devices. The processor 330 may execute the trigger frame reception software module 343 to receive trigger frames, to determine whether the trigger frames solicit a response from the STA 300, to determine whether the trigger frames allocate any dedicated RUs to the STA 300, and to determine whether the trigger frames allocate any random RUs that may be used by the STA 300. The processor 330 may execute the RU decoding software module 344 to determine which (if any) dedicated RUs are allocated to the STA 300, to determine which (if any) random RUs are allocated for use by the STA 300, and to determine the size, location, and other parameters of any allocated RUs. The processor 330 may execute the BSSID decoding software module 345 to determine the multiple BSSID capabilities of one or more APs and to determine whether one or more APs associated with a multiple BSSID set have queued DL traffic for the STA 300. In some aspects, the STA 300 may determine whether one or more APs have queued DL traffic for the STA 300 by decoding the partial virtual bitmap field of TIM elements provided in beacon frames.

Figure 4:
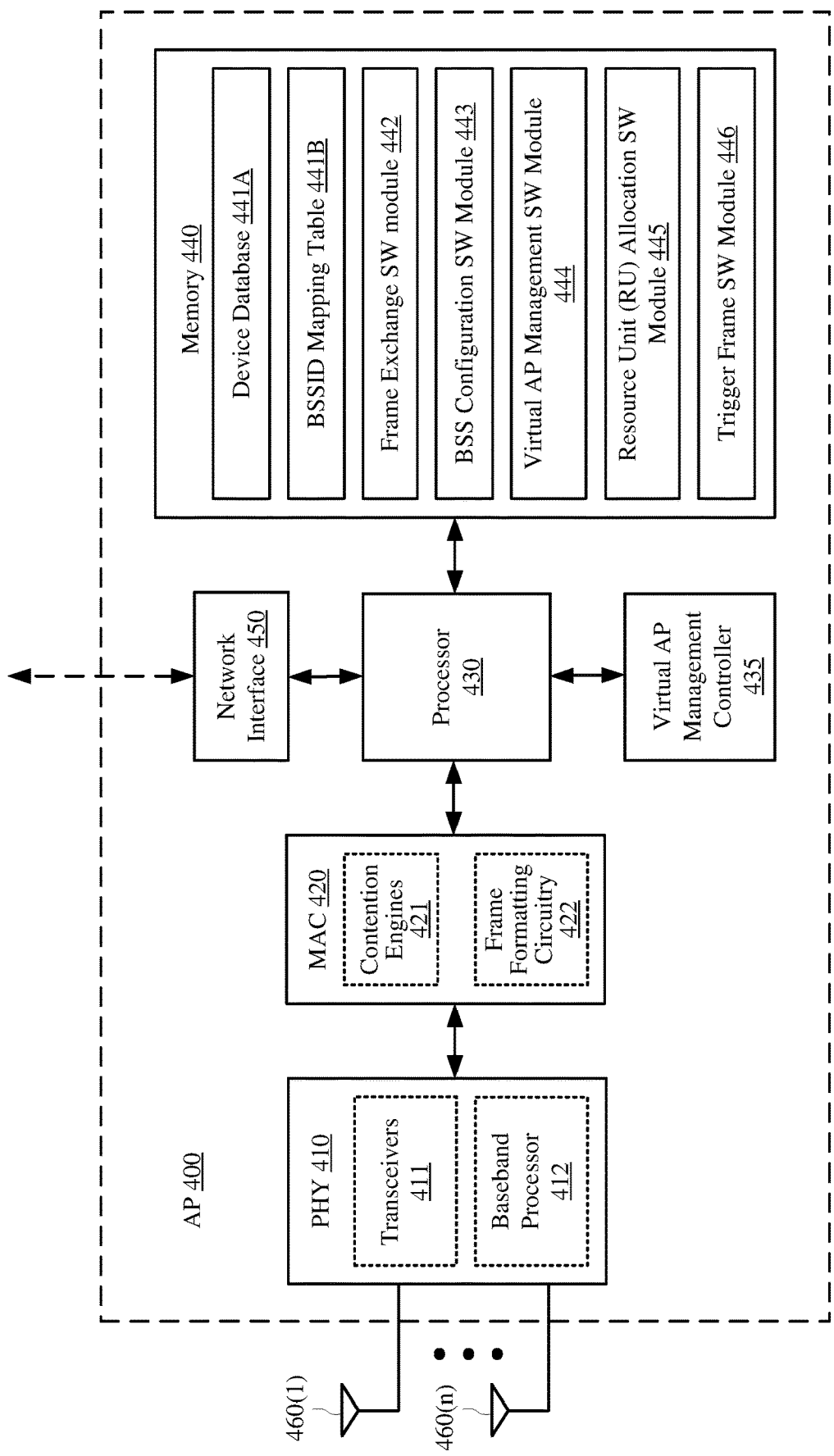
FIG. 4 shows a block diagram of an example access point.

FIG. 4 shows an example AP 400. In some implementations, the AP 400 may be one example of the AP 110 of FIG. 1A or the AP 140 of FIG. 1B. The AP 400 may include a PHY 410, a MAC 420, a processor 430, a virtual AP management controller 435, a memory 440, a network interface 450, and a number of antennas 460(1)-460(n). The PHY 410 may include at least a number of transceivers 411 and a baseband processor 412. The transceivers 411 may be coupled to the antennas 460(1)-460(n), either directly or through an antenna selection circuit (not shown for simplicity). The transceivers 411 may be used to communicate wirelessly with one or more STAs, with one or more other APs, and with other suitable devices. Although not shown in FIG. 4 for simplicity, the transceivers 411 may include any number of transmit chains to process and transmit signals to other wireless devices via the antennas 460(1)-460(n), and may include any number of receive chains to process signals received from the antennas 460(1)-460(n). In some implementations, the AP 400 may be configured for MIMO operations such as SU-MIMO operations and MU-MIMO operations. The AP 400 also may be configured for OFDMA communications and other suitable multiple access mechanisms, for example, as may be provided for in the IEEE 802.11ax standards.

The baseband processor 412 may be used to process signals received from the processor 430 or the memory 440 (or both) and to forward the processed signals to the transceivers 411 for transmission via one or more of the antennas 460(1)-460(n), and may be used to process signals received from one or more of the antennas 460(1)-460(n) via the transceivers 411 and to forward the processed signals to the processor 430 or the memory 440 (or both).

The network interface 450 may be used to communicate with a WLAN server (not shown for simplicity) either directly or via one or more intervening networks and to transmit signals. The virtual AP management controller 435 may be used to control and coordinate the operations of a number of virtual APs (such as the virtual access points VAP1-VAPk of FIG. 1B).

The MAC 420 may include at least a number of contention engines 421 and frame formatting circuitry 422. The contention engines 421 may contend for access to the shared wireless medium, and may also store packets for transmission over the shared wireless medium. In some implementations, the AP 400 may include one or more contention engines 421 for each of a plurality of different access categories. In other implementations, the contention engines 421 may be separate from the MAC 420. For still other implementations, the contention engines 421 may be implemented as one or more software modules (such as stored in the memory 440 or within memory provided within the MAC 420) containing instructions that, when executed by the processor 430, perform the functions of the contention engines 421.

The frame formatting circuitry 422 may be used to create and format frames received from the processor 430 (such as by adding MAC headers to PDUs provided by the processor 430), and may be used to re-format frames received from the PHY 410 (such as by stripping MAC headers from frames received from the PHY 410). Although the example of FIG. 4 depicts the MAC 420 coupled to the memory 440 via the processor 430, in other implementations, the PHY 410, the MAC 420, the processor 430, and the memory 440 may be connected using one or more buses (not shown for simplicity).

The processor 430 may be any suitable one or more processors capable of executing scripts or instructions of one or more software programs stored in the AP 400 (such as within the memory 440). In some implementations, the processor 430 may be or include one or more microprocessors providing the processor functionality and external memory providing at least a portion of machine-readable media. In other implementations, the processor 430 may be or include an Application Specific Integrated Circuit (ASIC) with the processor, the bus interface, the user interface, and at least a portion of the machine-readable media integrated into a single chip. In some other implementations, the processor 430 may be or include one or more Field Programmable Gate Arrays (FPGAs) or Programmable Logic Devices (PLDs).

The memory 440 may include a device database 441A that stores profile information for a plurality of STAs. The profile information for a particular STA may include, for example, its MAC address, its assigned AID value, supported data rates, connection history with the AP 400, one or more RUs allocated to the STA, the BSS with which the STA is associated, the multiple BSSID set to which the STA belongs, and any other suitable information pertaining to or describing the operation of the STA.

The memory 440 may also include a BSSID mapping table 441B that may store mapping information between AID values and BSSID indices, information indicating which wireless devices are part of or belong to each of a number of different BSSs, information relating to or describing a multiple BSSID set to which the AP 400 belongs, one or more characteristics or parameters of each of the different BSSs, and any other suitable information pertaining to or describing the operation of one or more BSSs that may be created by, operated by, or otherwise associated with the AP 400. In some aspects, the BSSID mapping table 441B also may store information indicating mapping information between a number of virtual APs and their corresponding BSSIDs.

The memory 440 may also include a non-transitory computer-readable medium (such as one or more nonvolatile memory elements, such as EPROM, EEPROM, Flash memory, a hard drive, and so on) that may store at least the following software (SW) modules:

a frame exchange software module 442 to facilitate the creation and exchange of any suitable frames (such as data frames, action frames, control frames, and management frames) between the AP 400 and other wireless devices, for example, as described below for one or more operations of FIGS. 7-8 and 11-13;

a BSS configuration software module 443 to set-up, configure, and operate multiple BSSs and to assign a number of wireless devices to each of the BSSs operated by the AP 400, for example, as described below for one or more operations of FIGS. 7-8 and 11-13;

a virtual AP management software module 444 to manage or otherwise coordinate the operations of a number of virtual APs associated with a corresponding number of different BSSs, for example, as described below for one or more operations of FIGS. 7-8 and 11-13;

a resource unit (RU) allocation software module 445 to allocate a number of dedicated RUs to a number of wireless devices identified by a trigger frame, to allocate a number of random RUs to be shared by a number of wireless devices that receive a trigger frame, and to allocate one or more random RUs to each of a number of selected basic service sets (such as one or more selected BSSIDs belonging to a multiple BSSID set), for example, as described below for one or more operations of FIGS. 7-8 and 11-13; and a trigger frame software module 446 to facilitate the transmission of trigger frames to one or more wireless devices, for example, as described below for one or more operations of FIGS. 7-8 and 11-13.

Each software module includes instructions that, when executed by the processor 430, cause the AP 400 to perform the corresponding functions. The non-transitory computer-readable medium of the memory 440 thus includes instructions for performing all or a portion of the operations described below with respect to FIGS. 7-8 and 11-13.

The processor 430 may execute the frame exchange software module 442 to facilitate the creation and exchange of any suitable frames (such as data frames, action frames, control frames, and management frames) between the AP 400 and other wireless devices. The processor 430 may execute the BSS configuration software module 443 to set-up, configure, and operate multiple BSSs and to assign a number of wireless devices to each of the BSSs operated by the AP 400. The processor 430 may execute the virtual AP management software module 444 to manage or otherwise coordinate the operations of a number of virtual APs associated with a corresponding number of different BSSs. In some aspects, execution of the virtual AP management software module 444 may be used to coordinate the allocation of random RUs by the different BSSs based one or more parameters, for example, that may increase the fairness with which all of the STAs belonging to a multiple BSSID set may contend with each other for access to the random RUs.

The processor 430 may execute the RU allocation software module 445 to allocate a number of dedicated RUs to a number of wireless devices identified by a trigger frame, to allocate a number of random RUs to be shared by a number of wireless devices that receive a trigger frame, and to allocate one or more random RUs to each of a number of selected basic service sets (such as one or more selected BSSIDs belonging to a multiple BSSID set). The processor 430 may execute the trigger frame software module 446 to facilitate the transmission of trigger frames to one or more wireless devices. In some aspects, execution of the trigger frame software module 446 may be used to allocate dedicated RUs to one or more identified STAs and to allocate random RUs to a selected group of STAs or to a selected group of BSSs in the same trigger frame.

The IEEE 802.11ax specification may introduce multiple access mechanisms, such as an orthogonal frequency-division multiple access (OFDMA) mechanism, to allow multiple STAs to transmit and receive data on a shared wireless medium at the same time. For a wireless network using OFDMA, the available frequency spectrum may be divided into a plurality of resource units (RUs) each including a number of different frequency subcarriers, and different RUs may be allocated or assigned (such as by an AP) to different wireless devices (such as STAs) at a given point in time. In this manner, multiple wireless devices may concurrently transmit data on the wireless medium using their assigned RUs or frequency subcarriers.

Figure 5A:
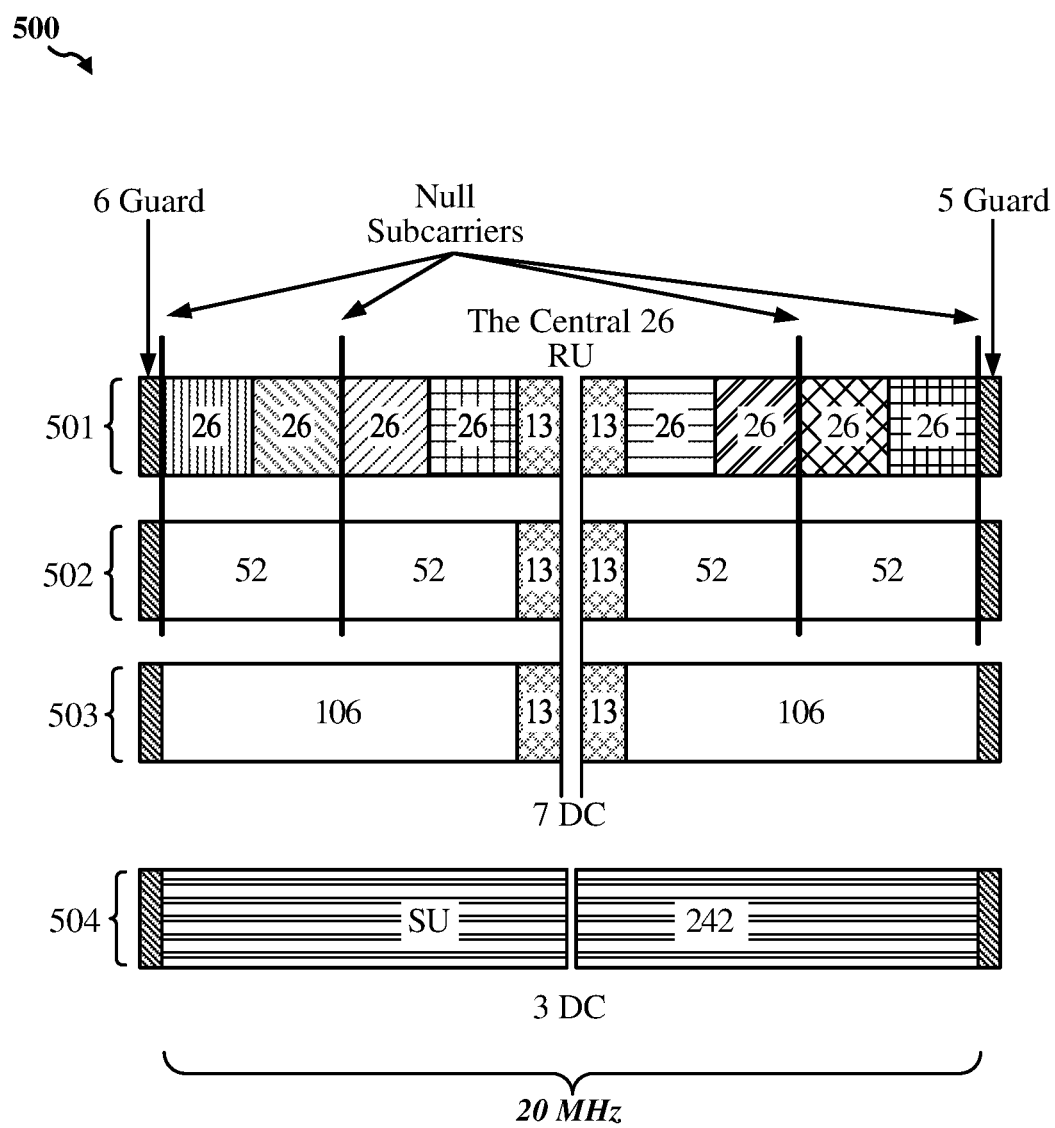
FIG. 5A shows an example subcarrier allocation diagram for a 20 MHz bandwidth.

FIG. 5A shows an example subcarrier allocation diagram 500 for a 20 MHz bandwidth according to the IEEE 802.11ax standards. As shown in FIG. 5A, a 20 MHz bandwidth may be divided into a number of resource units (RUs), and each RU may include a number of subcarriers. In some aspects, a first subcarrier allocation 501 may include a number of RUs each including 26 subcarriers, a second subcarrier allocation 502 may include a number of RUs each including 52 subcarriers, a third subcarrier allocation 503 may include a number of RUs each including 106 subcarriers, and a fourth subcarrier allocation 504 may include one RU including 242 subcarriers (with the left half of the channel for single-user (SU) operations). For each of the example subcarrier allocations 501-504 depicted in FIG. 5A, adjacent RUs may be separated by a null subcarrier (such as a DC subcarrier), for example, to reduce leakage between adjacent RUs.

Figure 5B:
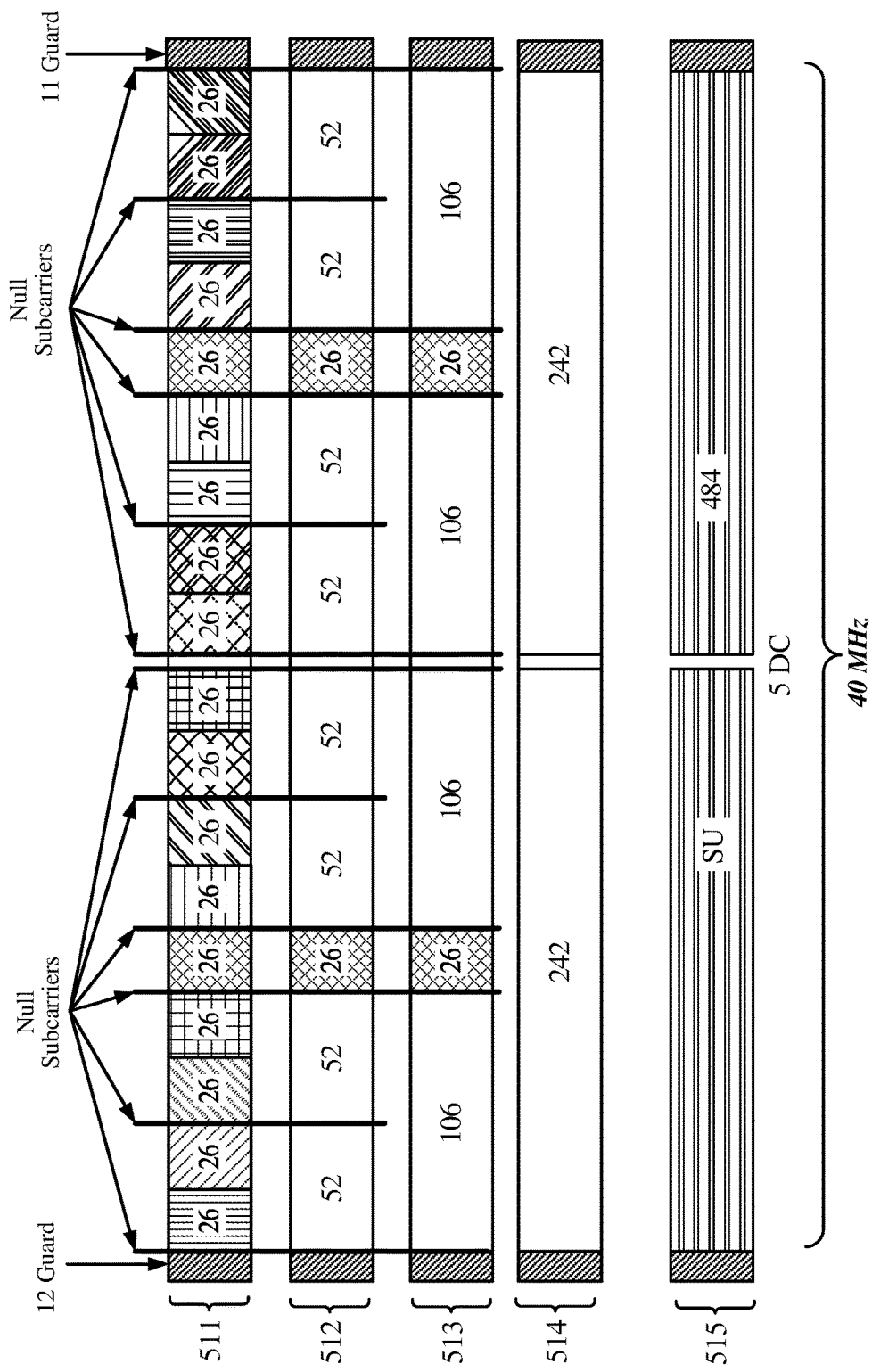
FIG. 5B shows an example subcarrier allocation diagram for a 40 MHz bandwidth.

FIG. 5B shows an example subcarrier allocation diagram 510 for a 40 MHz bandwidth according to the IEEE 802.11ax standards. As shown in FIG. 5B, a 40 MHz bandwidth may be divided into a number of RUs, and each RU may include a number of subcarriers. In some aspects, a first subcarrier allocation 511 may include a number of RUs each including 26 subcarriers, a second subcarrier allocation 512 may include a number of RUs each including 52 subcarriers, a third subcarrier allocation 513 may include a number of RUs each including 106 subcarriers, a fourth subcarrier allocation 514 may include a number of RUs each including 242 subcarriers, and a fifth subcarrier allocation 515 may include one RU including 484 subcarriers (with the left half of the channel for SU operations). For each of the example subcarrier allocations 511-515 depicted in FIG. 5B, adjacent RUs may be separated by a null subcarrier, for example, to reduce leakage between adjacent RUs.

Figure 5C:
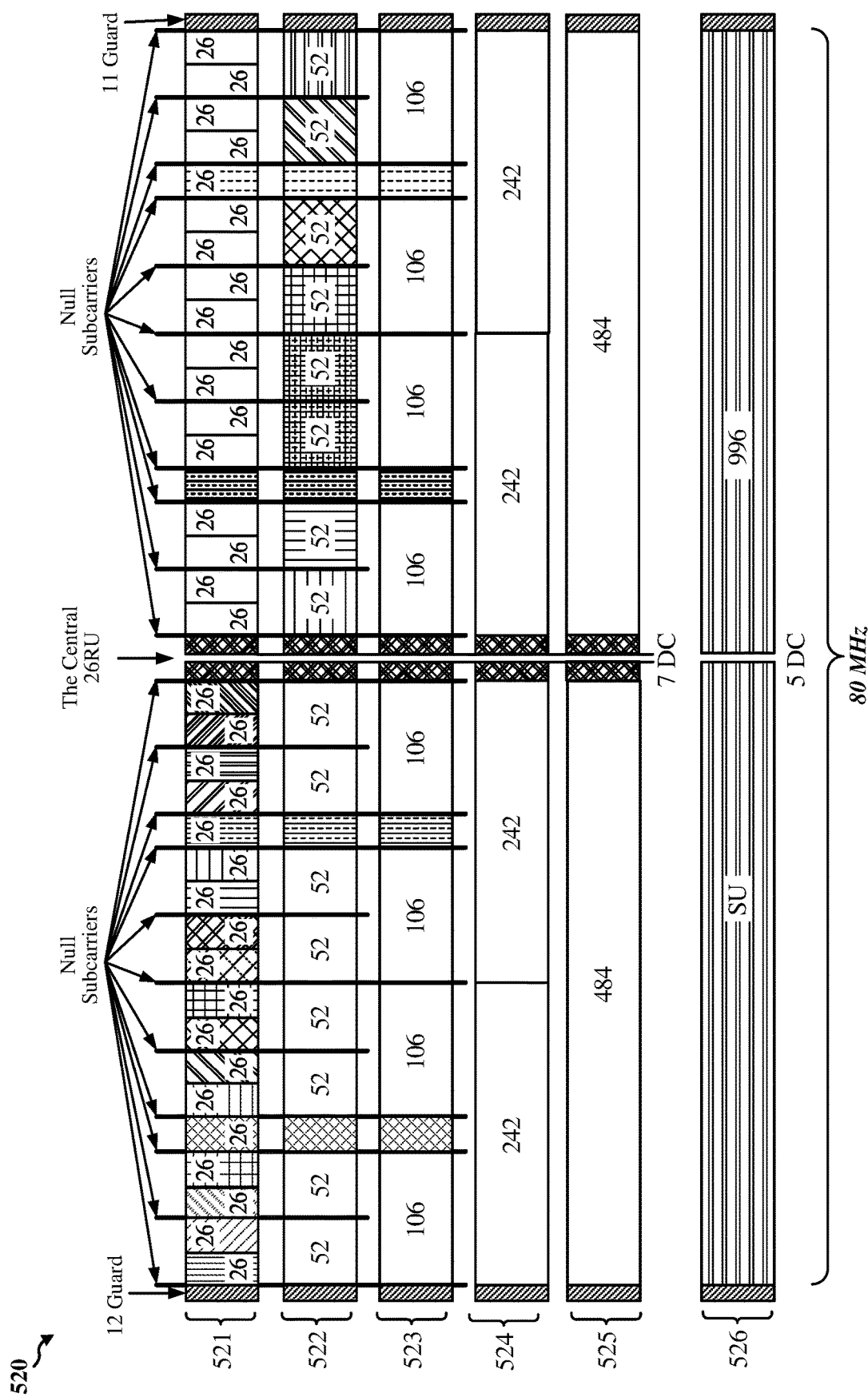
FIG. 5C shows an example subcarrier allocation diagram for an 80 MHz bandwidth.

FIG. 5C shows an example subcarrier allocation diagram 520 for an 80 MHz bandwidth according to the IEEE 802.11ax standards. As shown in FIG. 5C, an 80 MHz bandwidth may be divided into a number of resource units (RUs), and each RU may include a number of subcarriers. In some aspects, a first subcarrier allocation 521 may include a number of RUs each including 26 subcarriers, a second subcarrier allocation 522 may include a number of RUs each including 52 subcarriers, a third subcarrier allocation 523 may include a number of RUs each including 106 subcarriers, a fourth subcarrier allocation 524 may include a number of RUs each including 242 subcarriers, a fifth subcarrier allocation 525 may include a number of RUs each including 484 subcarriers, and a sixth subcarrier allocation 526 may include one RU including 996 subcarriers (with the left half of the channel for SU operations). For each of the example subcarrier allocations 521-526 depicted in FIG. 5C, adjacent RUs may be separated by a null subcarrier, for example, to reduce leakage between adjacent RUs.

An AP may allocate specific or dedicated RUs to a number of associated STAs using a trigger frame. In some implementations, the trigger frame may identify a number of STAs associated with the AP, and may solicit uplink (UL) multi-user (MU) data transmissions from the identified STAs using their allocated RUs. The trigger frame may use association identification (AID) values, assigned by the AP to its associated STAs, to identify which STAs are to transmit UL data to the AP in response to the trigger frame. In some aspects, the trigger frame may indicate the RU size and location, the modulation and coding scheme (MCS), and the power level for UL transmissions to be used by each of the STAs identified in the trigger frame. As used herein, the RU size may indicate the bandwidth of the RU, and the RU location may indicate which frequency subcarriers are allocated to the RU. A trigger frame that allocates dedicated RUs to a number of associated STAs identified in the trigger frame may be referred to herein as a "directed" trigger frame.

Figure 6A:
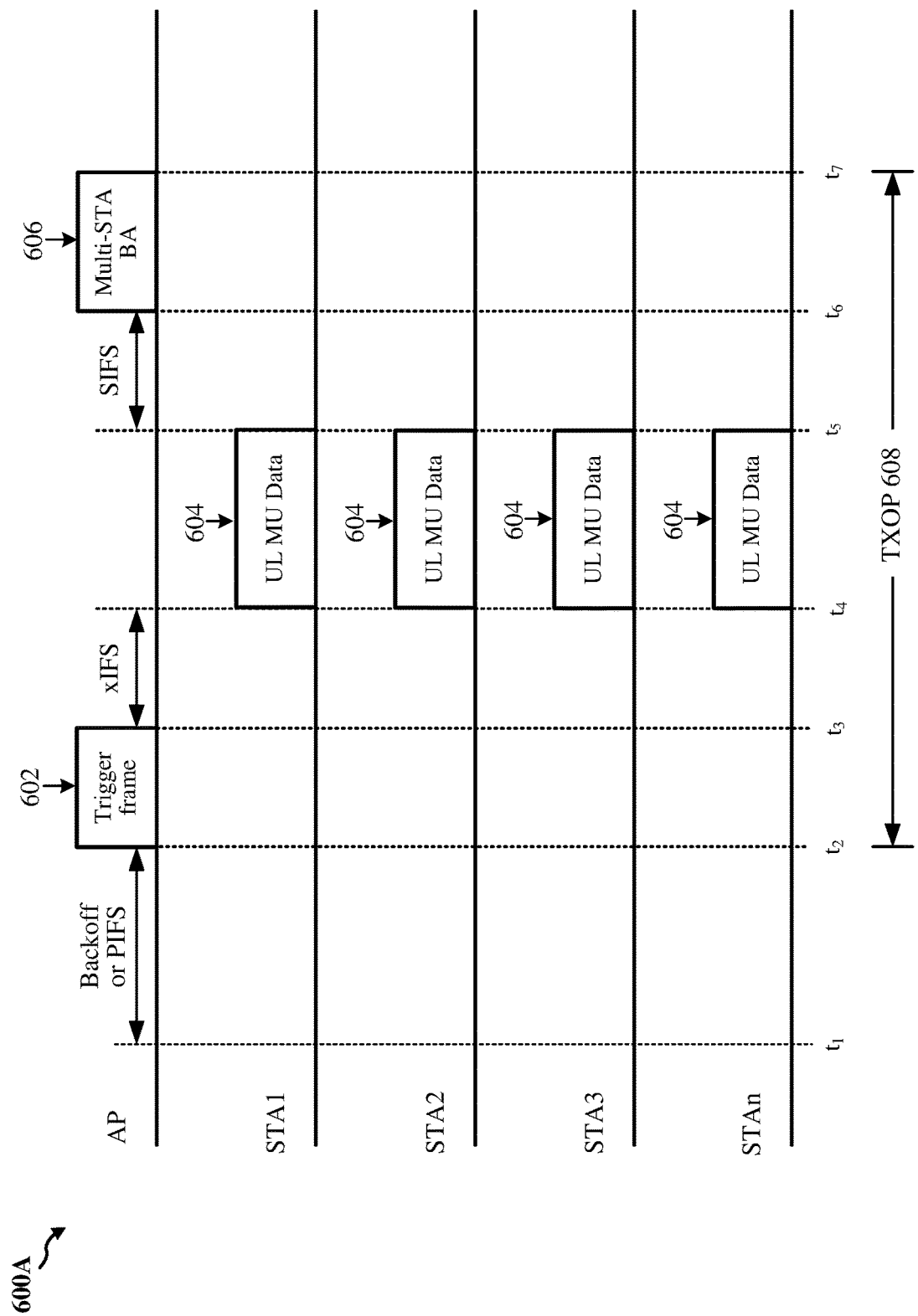
FIG. 6A shows a sequence diagram depicting an example allocation of dedicated resource units (RUs) to a number of wireless stations.

FIG. 6A shows a sequence diagram 600A depicting an example allocation of dedicated resource units (RUs) to a number of wireless stations. The AP of FIG. 6A may be any suitable AP including, for example, the AP 110 of FIG. 1A, the AP 140 of FIG. 1B, or the AP 400 of FIG. 4. Each of the wireless stations STA1-STAn may be any suitable wireless station including, for example, the stations STA1-STA4 of FIG. 1A, the stations STA1-STA99 of FIG. 1B, or the STA 300 of FIG. 3.

In some implementations, the AP may contend for medium access during a backoff period or a point coordination function (PCF) interframe space (PIFS) duration (such as between times $t_1$ and $t_2$). In other implementations, the AP may contend for medium access using another suitable channel access mechanism. In some other implementations, the AP may utilize a multiple channel access mechanism, for example, and may not contend for medium access.

The AP gains access to the wireless medium at time $t_2$, and may transmit a directed trigger frame 602 to the stations STA1-STAn on a downlink (DL) channel. Time $t_2$ may indicate a beginning of a transmit opportunity (TXOP) 608. The directed trigger frame 602 may allocate a dedicated RU to each of a number of stations STA1-STAn identified by the directed trigger frame 602 for uplink (UL) transmissions. In some aspects, the dedicated RUs allocated by the directed trigger frame 602 may be unique, for example, so that the identified stations may transmit UL data to the AP at the same time (or at substantially the same time). The directed trigger frame 602 also may solicit UL MU data transmissions from stations identified by the directed trigger frame 602.

The stations STA1-STAn may receive the directed trigger frame 602 at (or around) time $t_3$. Each of the stations STA1-STAn may decode a portion of the directed trigger frame 602 to determine whether the station is identified by the directed trigger frame 602. In some aspects, the directed trigger frame 602 may use AID values assigned to the stations STA1-STAn to identify which of the stations STA1-STAn have been allocated dedicated RUs and to indicate which of the stations STA1-STAn are to transmit UL data based on reception of the directed trigger frame 602. Each of the stations STA1-STAn that is not identified by the directed trigger frame 602 may not transmit UL data during the TXOP 608, for example, because they may not have been allocated dedicated RUs for UL transmissions during the TXOP 608.

Each of the stations STA1-STAn that is identified by the directed trigger frame 602 may decode additional portions of the directed trigger frame 602 to determine the size and location of the dedicated RU allocated thereto. In some aspects, the directed trigger frame 602 may schedule UL data transmissions from the identified stations STA1-STAn to commence at an unspecified interframe spacing (xIFS) duration after reception of the directed trigger frame 602, for example, as depicted in FIG. 6A.

At time $t_4$, the stations STA1-STAn identified by the directed trigger frame 602 may begin transmitting UL MU data 604 on their respective dedicated RUs. In some aspects, each of the stations STA1-STAn identified by the directed trigger frame 602 may determine whether the frequency band associated with its allocated RU has been idle for a duration (such as a PIFS duration) prior to transmitting UL MU data to the AP. For the example of FIG. 6A, all of the stations STA1-STAn are allocated a dedicated RU by the directed trigger frame 602, and all of the stations STA1-STAn transmit UL MU data to the AP using their respective dedicated RUs. In other implementations, a subset (such as less than all) of the stations STA1-STAn may be allocated dedicated RUs by the directed trigger frame 602.

The AP may receive the UL MU data 604 from the identified stations STA1-STAn at time $t_5$, and may acknowledge reception of the UL MU data 604 from the stations STA1-STAn by transmitting acknowledgement (ACK) frames at time $t_6$. In some aspects, the AP may acknowledge reception of the UL MU data by transmitting an MU ACK frame to the stations STA1-STAn. In other aspects, the AP may acknowledge reception of the UL MU data by transmitting a multi-station block acknowledgement (M-BA) frame 606 to the stations STA1-STAn, for example, as depicted in FIG. 6A.

In some implementations, the AP may transmit the M-BA frame 606 a short interframe spacing (SIFS) duration after receiving the UL MU data transmitted from the stations STA1-STAn (as shown in FIG. 6A). In other implementations, the AP may transmit the M-BA frame 606 after another suitable duration.

In addition, or in the alternative, the AP may transmit a trigger frame that allocates random RUs to the stations STA1-STAn for UL data transmissions. In some implementations, the random RUs may be contention-based resources that are shared by all STAs that receive the trigger frame. The random RUs may be used by any STA that receives the trigger frame, including STAs that are not associated with the AP. Allocation of the random RUs may allow STAs that were not identified in the directed trigger frame 602 to transmit UL data to the AP (such as by using the random RUs rather than the dedicated RUs allocated by the directed trigger frame 602). The exclusion of a given STA from UL data transmissions on dedicated RUs allocated by the directed trigger frame 602 may be based on a variety of factors including, for example, a failure of the AP to receive a buffer status report (BSR) from the given STA, a limited number of dedicated RUs that may be allocated for UL MU data transmissions, or the absence of an AID assigned to the given STA (such as because the given STA is not associated with the AP). A trigger frame that allocates random RUs (such as for OFDMA-based random channel access) to all receiving STAs may be referred to herein as a "wildcard" trigger frame.

Figure 6B:
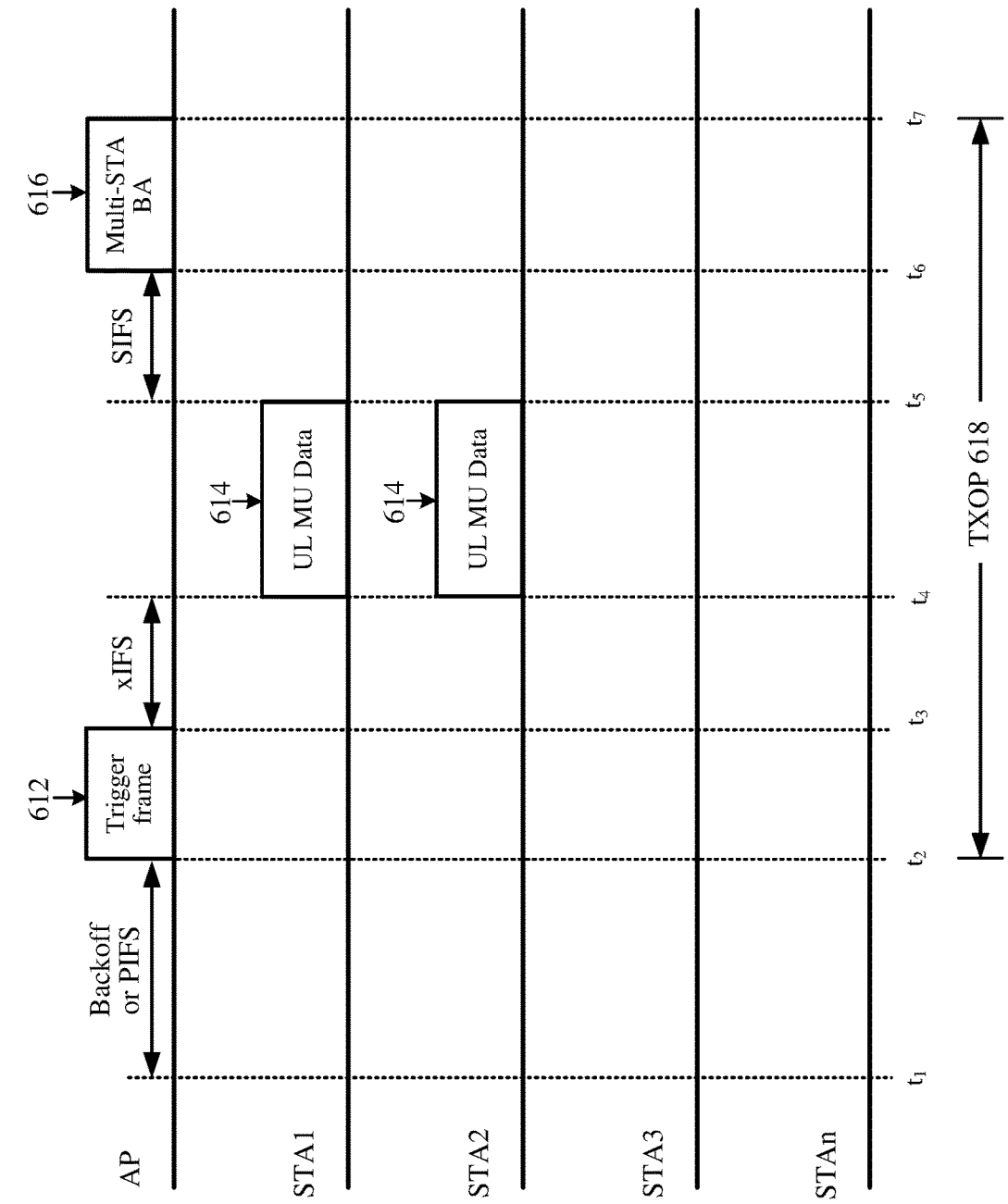
FIG. 6B shows a sequence diagram depicting an example allocation of random RUs to a number of wireless stations.

FIG. 6B shows a sequence diagram 600B depicting an example allocation of random RUs. The AP of FIG. 6B may be any suitable AP including, for example, the AP 110 of FIG. 1A, the AP 140 of FIG. 1B, or the AP 400 of FIG. 4. Each of the wireless stations STA1-STAn may be any suitable wireless station including, for example, the stations STA1-STA4 of FIG. 1A, the stations STA1-STA99 of FIG. 1B, or the STA 300 of FIG. 3.

In some implementations, the AP may contend for medium access during a backoff period or a PIFS duration.

In other implementations, the AP may contend for medium access using another suitable channel access mechanism. In some other implementations, the AP may utilize a multiple channel access mechanism.

The AP gains access to the wireless medium at time $t_2$, and may transmit a wildcard trigger frame 612 to the stations STA1-STAn on the DL channel. Time $t_2$ may indicate a beginning of a transmit opportunity (TXOP) 618. The wildcard trigger frame 612 may allocate one or more random RUs upon which the stations STA1-STAn may transmit UL MU data to the AP. The trigger frame 612 may allocate random RUs using pre-defined AID values, for example, where an AID value=0 indicates the allocation of random RUs to associated STAs and an AID value=2045 indicates the allocation of random RUs to un-associated STAs.

The stations STA1-STAn may receive the wildcard trigger frame 612 at (or around) time $t_3$, and may contend with each other for access to the allocated random RUs. In some aspects, the wildcard trigger frame 612 may be a broadcast frame that allows any receiving wireless device to contend for access to the random RUs allocated by the wildcard trigger frame 612. In other aspects, the wildcard trigger frame 612 may be a multicast frame that allows a selected subset of the stations STA1-STAn to contend for access to the random RUs allocated by the wildcard trigger frame 612.

In some implementations, the stations STA1-STAn may use the DCF or PCF back-off procedure to contend for access to the random RUs. In other implementations, the stations STA1-STAn may use an opportunistic back-off (OBO) procedure to contend for access to the random RUs, for example, as depicted in the FIG. 6B. The OBO procedure is a distributed random channel access mechanism for which each STA selects a random back-off number that may be used to select one of the random RUs allocated by the wildcard trigger frame 612. For example, if the AP allocates four random RUs to be shared as contention-based resources, and a given STA selects an OBO value of 3, then the given STA may transmit UL MU data using the third random RU. Conversely, if the given STA selects an OBO value of 5, then the given STA may not use the random RUs to transmit UL data during the TXOP 618 (such as because the four random RUs may be used by STAs that selected OBO values of 1 through 4). After expiration of the TXOP 618, the given STA may update its OBO value from 5 to 1, and then transmit UL MU data using the first random RU during a next TXOP.

For the example of FIG. 6B, stations STA1 and STA2 gain access to the random RUs allocated by the wildcard trigger frame 612 at time $t_4$, and begin transmitting UL MU data 614 to the AP during the TXOP 618. The other stations (such as stations STA3-STAn) may not use the random RUs allocated by the wildcard trigger frame 612 to transmit UL data during the TXOP 618, for example, because their initial OBO values may be greater than the number of random RUs allocated by the wildcard trigger frame 612.

The AP may receive the UL MU data 614 from stations STA1 and STA2 at time $t_5$, and may acknowledge reception of the UL MU data 614 by transmitting acknowledgement (ACK) frames at time $t_6$. In some aspects, the AP may acknowledge reception of the UL MU data 614 by transmitting an MU ACK frame to stations STA1 and STA2. In other aspects, the AP may acknowledge reception of the UL MU data 614 by transmitting a multi-station block acknowledgement (M-BA) frame 616 to stations STA1 and STA2, for example, as depicted in FIG. 6B.

Referring again to FIG. 1B, the AP 140 may create and independently operate a plurality of basic service sets BSS0-BSSk (such as by using the virtual access points VAP1-VAPk), and each of the basic service sets BSS0-BSSk may include a different number of wireless devices or stations. In some implementations, the AP 140 may assign each of the example stations STA1-STA99 of FIG. 1B to a particular one of the basic service sets BSS0-BSSk based on a number of parameters of one or more of the basic service sets BSS0-BSSk. In some aspects, the number of parameters of a given one of the basic service sets BSS0-BSSk may include one or more of: security parameters of the given BSS, access privileges of the wireless devices associated with or belonging to the given BSS, the types of wireless devices (such as IoT devices, Wi-Fi devices, and so on) associated with or belonging to the given BSS, quality of service (QoS) parameters of the given BSS, delay requirements (such as relatively short delays for voice traffic and relatively long delays for background or best effort traffic) of the wireless devices associated with or belonging to the given BSS, bandwidth capabilities of the wireless devices associated with or belonging to the given BSS (such as narrowband capabilities and wideband capabilities), and any other suitable metric or characteristic that may be used to prioritize the allocation of random RUs to the plurality of basic service sets BSS0-BSSk.

Figure 7:
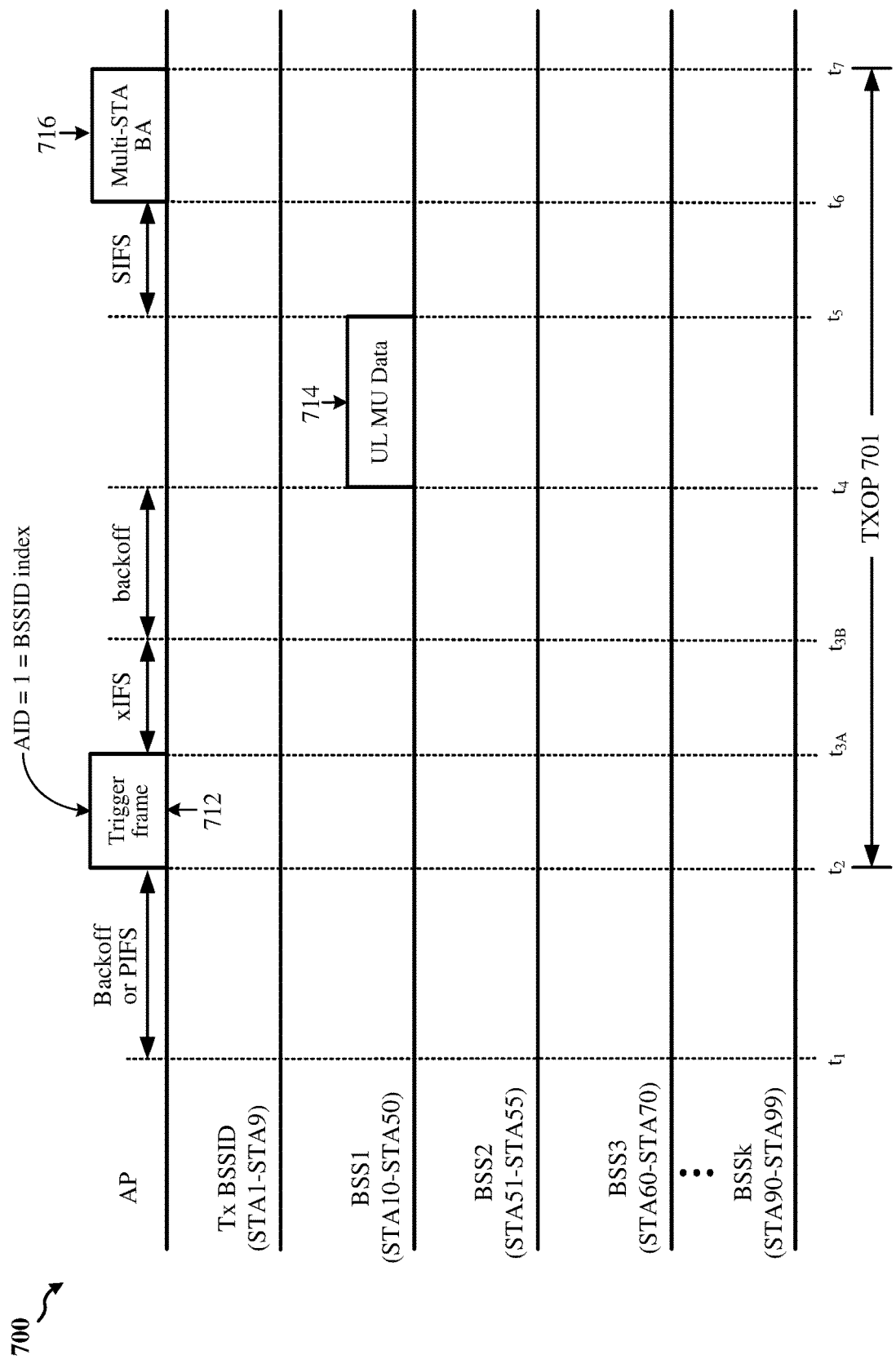
FIG. 7 shows a sequence diagram depicting an example allocation of random RUs to a selected Basic Service Set (BSS).

FIG. 7 shows a sequence diagram 700 depicting an example allocation of random RUs to a specific basic service set (BSS). The AP of FIG. 7 may be any suitable AP including, for example, the AP 110 of FIG. 1A, the AP 140 of FIG. 1B, or the AP 400 of FIG. 4. The example operation of FIG. 7 is described below with respect to the multiple BSSID set 130 of FIG. 1B, and the AP of FIG. 7 is associated with the Tx BSSID. Thus, for the example operation of FIG. 7, the basic service set BSS0 of FIG. 1B is designated as the Tx BSSID, and each of the other basic service sets BSS1-BSSk of FIG. 1B is designated as a non-Tx BSSID. Although not shown for simplicity, each of the non-Tx BSSIDs may be operated by an associated AP (or an associated virtual AP such as one of the virtual access points VAP1-VAP7 of FIG. 1B).

In some implementations, the AP may contend for medium access during a backoff period or a point coordination function (PCF) interframe space (PIFS) duration (such as between times $t_1$ and $t_2$). In other implementations, the AP may contend for medium access using another suitable channel access mechanism. In some other implementations, the AP may utilize a multiple channel access mechanism, for example, and may not contend for medium access.

The AP gains access to the wireless medium at time $t_2$, and may transmit a trigger frame 712 on a DL channel to the stations STA1-STA99 belonging to the multiple BSSID set 130. Time $t_2$ may indicate a beginning of a transmit opportunity (TXOP) 701. The trigger frame 712 may allocate one or more random RUs to each of a selected number of the plurality of basic service sets BSS0-BSSk, for example, so that the stations (or other wireless devices) associated with the selected BSSs may transmit UL data to the AP (or to other devices) using the random RUs allocated by the trigger frame 712. In some implementations, the trigger frame 712 may contain one or more values identifying the selected BSSs, and may indicate the size and location of the random RUs allocated to each of the selected BSSs. The selected number of BSSs may be a subset of the BSSs operated or controlled by the AP, for example, so that the random RUs allocated by the AP are not available to all BSSs operated or controlled by the AP.

In some implementations, the trigger frame 712 may allocate one or more random RUs to a selected BSS, rather than to specific stations, by setting one of its AID values to the BSSID index assigned to the selected BSS. In some aspects, random RUs allocated to the selected BSS by the trigger frame 712 may be shared by any number of the stations associated with the selected BSS. Thus, rather than identifying a particular station to which one or more random RUs are allocated, each AID value provided in the trigger frame 712 may identify a particular BSS to which one or more random RUs are allocated.

In some aspects, the trigger frame 712 may be a broadcast frame that allows any stations (or other wireless devices) associated with the selected BSSs to contend for access to the random RUs allocated by the trigger frame 712. In other aspects, the trigger frame 712 may be a multicast frame that allows a group of stations associated with the selected BSSs to contend for access to the random RUs allocated by the trigger frame 712.

Stations within range of the AP 110 may receive the trigger frame 712 at (or around) time $t_{3A}$. Each of the stations that receives the trigger frame 712 may decode the AID value(s) included in the trigger frame 712 to determine whether the BSS to which the station belongs has been allocated random RUs. In some implementations, if a given station determines that an AID value included in the trigger frame 712 matches the BSSID index of its associated BSS, then the given station may contend for access to the random RUs allocated by the trigger frame 712. Conversely, if a given station determines that the trigger frame 712 does not include an AID value that matches the BSSID index of its associated BSS, then the given station may not contend for access to the random RUs allocated by the trigger frame 712.

For the example of FIG. 7, the AP selects the basic service set BSS1 for allocation of the random RUs, and an AID value contained in the trigger frame 712 is set to the BSSID index of the basic service set BSS1 (such as AID=BSSID index=1). Because the stations STA10-STA50 are associated with the basic service set BSS1 assigned to a BSSID index=1, the stations STA10-STA50 may contend with each other for access to the random RUs allocated by the trigger frame 712 at time $t_{3B}$ (which may be an xIFS duration after time $t_{3A}$). Stations that are not associated with the selected BSS (such as stations STA51-STA99 of FIG. 1B) may not contend for access to the random RUs allocated by the trigger frame 712. In some aspects, stations that are not associated with the selected BSS may return to a power save state.

The first station STA10 associated with the selected basic service set BSS1 is depicted as gaining access to the wireless medium (after a backoff period between times $t_{3B}$ and $t_4$), and begins transmitting UL data on the random RU allocated by the trigger frame 712 at time $t_4$. In some aspects, the first station STA10 may use the random RU to transmit UL data within its associated basic service set BSS1. In other aspects, the first station STA10 may use the random RU to transmit UL data to wireless devices associated with other basic service sets.

The AP may receive the UL MU data 714 from the first station STA10 at time $t_5$, and may acknowledge reception of the UL MU data 714 by transmitting an M-BA frame 716 to the first station STA10 at time $t_6$. In other aspects, the AP may acknowledge reception of the UL MU data 714 by transmitting an MU ACK frame to the first station STA10.

The ability to allocate random RUs for use by stations associated with a specific basic service set of a multiple BSSID set using a trigger frame may increase medium utilization and efficiency (as compared to allocating random RUs to all of the stations in the multiple BSSID set). For one example, if a first BSS includes 100 wireless devices and a second BSS includes 3 wireless devices, then allocating random RUs to all wireless devices associated with the AP may result in the wireless devices belonging to the second BSS receiving a disproportionate share of the random RUs allocated by the AP. Thus, by allocating random RUs to wireless devices belonging to the first BSS (rather than to wireless devices belonging to all BSSs operated or controlled by the AP), the AP may prioritize the allocation of random RUs based on the number of wireless devices that belong to the first BSS. In other words, because more wireless devices belong to the first BSS than to the second BSS, the AP may allocate more random RUs to the first BSS than to the second BSS (or may allocate random RUs to the first BSS more frequently than to the second BSS).

For another example, if a first BSS includes 4 smartphones that frequently implement VoIP calls and a second BSS includes 10 IoT devices (such as smart sensors), then allocating random RUs to all wireless devices associated with the AP using conventional RU allocation techniques may result in allocations of random RUs to sensor devices (which typically do not have delay-critical traffic) that would otherwise be available to facilitate VoIP calls and other real-time traffic corresponding to the first BSS. Thus, by allocating random RUs to the 4 smartphones belonging to the first BSS (and not to the 10 IoT devices belonging to the second BSS), the AP may prioritize the allocation of random RUs based on traffic classes and delay or latency requirements.

In some other implementations, a trigger frame may be defined that can allocate dedicated RUs to one or more identified STAs, can allocate random RUs to one or more specific basic service sets belonging to a multiple BSSID set (and thereby allow a number of STAs to share the allocated random RUs irrespective of whether the STAs are associated with the Tx BSSID or with one of the non-Tx BSSIDs and/or can allocate random RUs to unassociated STAs. In other words, an AP corresponding to the Tx BSSID of a multiple BSSID set can use trigger frames disclosed herein to allocate dedicated RUs to STAs belonging to the Tx BSSID, to allocate dedicated RUs to STAs belonging to any of the non-Tx BSSIDs, to allocate random RUs to be shared by the STAs belonging to the Tx BSSID, to allocate random RUs to be shared by the STAs belonging to any of the non-Tx BSSIDs, to allocate random RUs to be shared by all the STAs belonging to the multiple BSSID set, to allocate random RUs to be shared by all unassociated STAs, or any combination thereof.

In some aspects, the STAs belonging to the multiple BSSID set can indicate their ability to receive multi-BSS control frames by setting the RX multi-BSS Control Frame bit in a HE Capabilities element, for example, during discovery operations (such as in a probe request frame) or during association operations (such as in an association request frame). In other aspects, the STAs can indicate their ability to receive multi-BSS control frames in any other suitable element.

The ability of an AP associated with the Tx BSSID to solicit UL data transmissions from individual STAs belonging to the multiple BSSID set, irrespective of which BSSID the individual STAs belong to, may allow the AP to coordinate the allocation of not only dedicated RUs but also random RUs on both a per-BSS basis and on a per-STA basis. This may allow the AP to increase the fairness with which the STAs belonging to the multiple BSSID set are given the opportunity to contend for access to random RUs. In some implementations, the AP can use trigger frames disclosed herein to adjust the allocation of random RUs between the STAs belonging to the multiple BSSID set based on a number of factors including, for example, the number of STAs associated with each of the BSSs, the traffic types of each of the BSSs, the priority levels of traffic flows in each of the BSSs, congestion in each of the BSSs, and so on.

Figure 8:
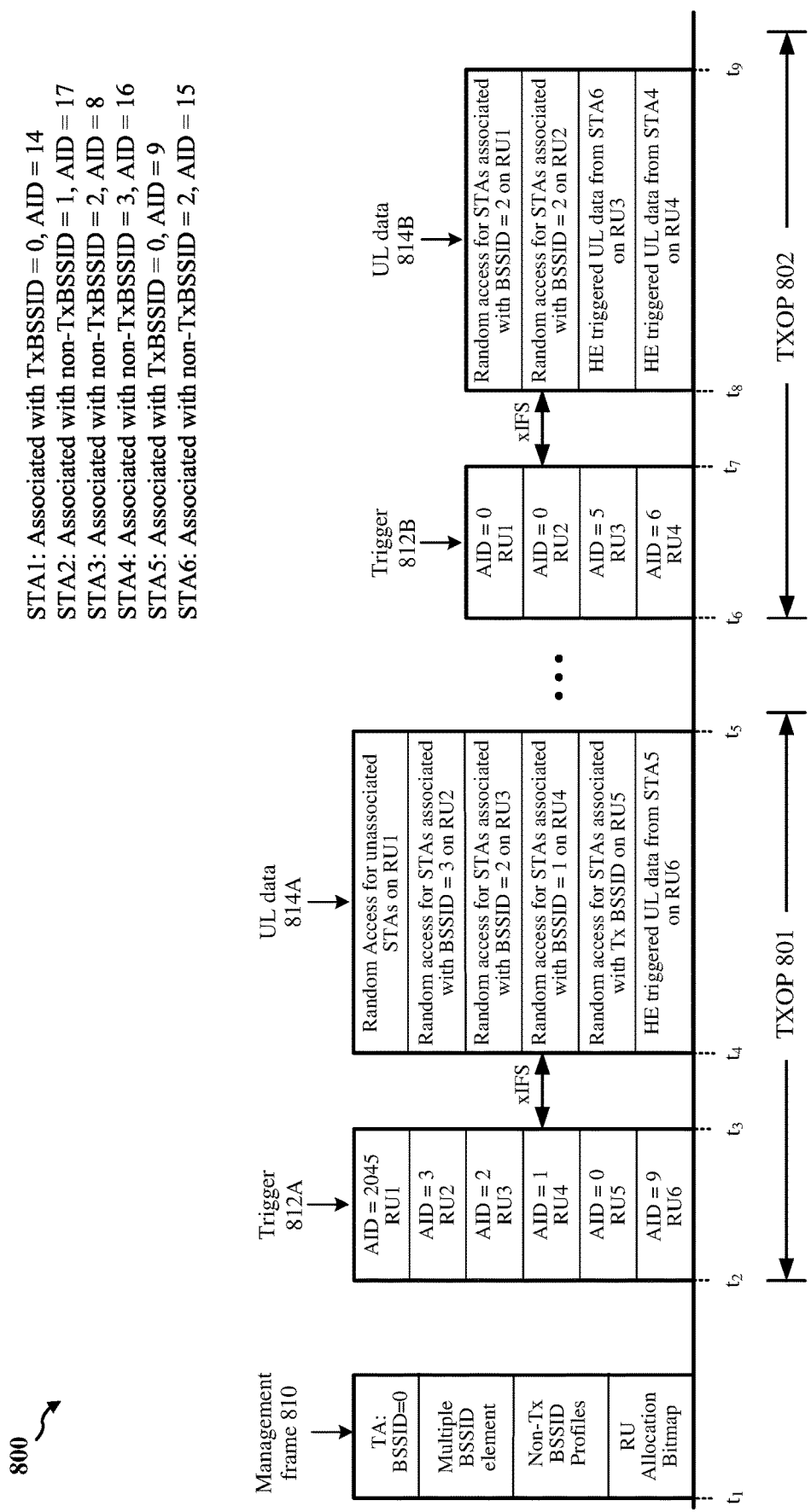
FIG. 8 shows a sequence diagram depicting an example allocation of dedicated RUs and random RUs to a number of STAs belonging to a multiple BSSID set.

FIG. 8 shows a sequence diagram depicting an example operation 800 for allocating dedicated RUs and random RUs for use by a number of STAs belonging to a multiple BSSID set. The example operation 800 is described below with respect to the multiple BSSID set 130 of FIG. 1B, and may be performed by an AP that operates the BSS corresponding to the Tx BSSID. Although not shown in FIG. 8 for simplicity, the multiple BSSID set includes a Tx BSSID and seven non-Tx BSSIDs. Referring also to FIG. 1B, the AP that transmits trigger frames in the example operation 800 is associated with the Tx BSSID, and may be referred to as the Tx AP. Each of the non-Tx BSSIDs may be associated with another AP (such as a respective one of the access points AP1-AP7 or a respective one of the virtual access points VAP1-VAP7). The APs (or virtual APs) associated with the non-Tx BSSID may be referred to as non-Tx APs.

For the example of FIG. 8, station STA1 is associated with the Tx BSSID (which has a BSSID index=0) and is assigned AID=14, station STA2 is associated with a non-Tx BSSID having a BSSID index=1 and is assigned AID=17, station STA3 is associated with a non-Tx BSSID having a BSSID index=2 and is assigned AID=8, station STA4 is associated with a non-Tx BSSID having a BSSID index=3 and is assigned AID=16, station STA5 is associated with the Tx BSSID=0 and is assigned AID=9, and station STA6 is associated with a non-Tx BSSID having a BSSID index=2 and is assigned AID=15.

Prior to the operation 800, the Tx AP may announce that it belongs to a multiple BSSID set and advertise its multiple BSSID capabilities using a multiple BSSID element contained in a management frame (such as a beacon frame or a probe response frame). Nearby STAs may indicate their support for the Multiple BSSID capability using by setting a bit in the Extended Capabilities element of a suitable response frame. In addition, or in the alternative, nearby STAs may include the Extended Capabilities element in a probe request frame transmitted to the AP. Although the non-Tx APs corresponding to the non-Tx BSSIDs may not transmit management frames containing a multiple BSSID element, the multiple BSSID capabilities of the non-Tx APs can be announced or advertised in one or more Multiple BSSID elements transmitted by the Tx AP. In some aspects, one or more management frames (such as beacon frames or probe response frames) transmitted by the Tx AP may contain a number of non-Tx BSSID profiles 205 that indicate the multiple BSSID capabilities of the non-Tx BSSIDs.

In accordance with aspects of the present disclosure, each of the APs belonging to the multiple BSSID set may announce or advertise its own random access parameter set (RAPS) element. The RAPS elements may signal one or more metrics of an OFDMA-based random access mechanism. Each RAPS element may include an OFDMA Contention Window (OCW) range field that stores a minimum OCW value and a maximum OCW value for a corresponding AP. During random channel access operations, each of the receiving stations may select an OBO count value that is between the minimum OCW value and the maximum OCW value indicated in the corresponding RAPS element. For example, when a trigger frame allocates random RUs for use by STAs belonging to the multiple BSSID set, a STA that receives the trigger frame may select a OBO count value that is between the minimum OCW value and the maximum OCW value signaled for its corresponding BSSID. In some aspects, each of the non-Tx BSSIDs may select its own RAPS value based on, for example, the number of associated STAs. In other implementations, a particular non-Tx BSSID may be configured (such as by a user or network administrator) to not allocate random RUs to its associated STAs. In some aspects, the particular non-Tx BSSID may indicate that it does not support random access feature and does not allocate random RUs by advertising a RAPS element that includes a special value or a dedicated field explicitly indicating that the particular non-Tx BSSID does not allocate random RUs. In other aspects, the particular non-Tx BSSID may indicate that it does not allocate random RUs by advertising a null RAPS element. For example, the null RAPS element may be a RAPS element that includes only an element ID field and a length field (which may be set to 1). Null RAPS elements are described in more detail below with respect to FIG. 10c.

In some implementations, the RAPS elements of the non-Tx BSSIDs may be announced in management frames transmitted by the Tx AP. In some aspects, the RAPS elements may be provided in the non-Tx BSSID profiles 205 of multiple BSSID elements 200 contained in the management frame. In this manner, all the STAs belonging to the multiple BSSID set may determine their minimum and maximum OCW values from the management frames. If the RAPS element of a particular non-Tx BSSID is not included in management frames transmitted by the Tx BSSID, or if the particular non-Tx BSSID does not advertise or otherwise provide its RAPS element to its associated STAs, then the STAs associated with the particular non-Tx BSSID may use the RAPS element of the Tx BSSID to determine the minimum and maximum OCW values for random access channel operations. In this manner, STAs that do not receive a RAPS element from their associated APs may "inherit" the RAPS elements of the Tx BSSID. In other aspects, if the non-Tx BSSID transmits a RAPS element that is different from the RAPS of the (if your AP transmits it, follow it; if it doesn't, then inherit the RAPS from the Tx BSSID.

At time $t_1$, the Tx AP transmits a management frame 810. The management frame 810 is shown to include a transmitter address (TA) field, a multiple BSSID element, a number of non-Tx BSSID profiles, and a RU allocation bitmap. The TA field may store the transmitter address of the Tx AP, for example, to indicate that the Tx AP corresponds to the Tx BSSID. Thus, for the example of FIG. 8, the TA field of the management frame 810 may store a BSSID index=0. The non-Tx BSSID profiles, which may be one implementation of the non-Tx BSSID profile 205 of FIG. 2A, may contain a list of elements for one or more of the other access points AP1-AP7 corresponding to the non-Tx BSSIDs. In some aspects, the non-Tx BSSID profile contained in the management frame 810 may contain a non-Tx BSSID capabilities element 210, an SSID and BSSID-index element 220, and an FMS descriptor element 230. The RU allocation bitmap may store a bitmap indicating the allocation of dedicated RUs to one or more identified STAs and the allocation of random RUs to individual BSSIDs or to groups of STAs (such as the STAs associated with a selected number of the BSSIDs) belonging to the multiple BSSID set.

Each STA that receives the management frame 810 may examine one of the bits B0-B7 in the BSSID portion 242A of the partial virtual bitmap 242 to determine a presence of group address traffic for a corresponding one of the BSSIDs belonging to the multiple BSSID set, and may examine one of the bits in the STA portion 242B of the partial virtual bitmap 242 to determine a presence of DL data for the STA. More specifically, a particular STA that receives the management frame 810 may determine whether any of the BSSIDs has DL data for the STA by examining two bits in the partial virtual bitmap of the TIM element: the bit in the BSSID portion of the partial virtual bitmap corresponding to the BSSID with which the particular STA is associated, and the bit in the STA portion of the partial virtual bitmap corresponding to the AID value assigned to the particular STA.

After gaining access to the wireless medium, the Tx AP transmits a first trigger frame 812A at time $t_2$ (which may indicate a beginning of a first TXOP 801). When the first trigger frame 812A is transmitted from the Tx BSSID, the transmitter address (TA) of the first trigger frame 812A is set to the MAC address of the Tx BSSID. The first trigger frame 812A may allocate dedicated RUs to one or more identified STAs and/or may allocate random RUs to individual BSSIDs or to groups of STAs (such as the STAs associated with each of a selected number of the BSSIDs). In accordance with some aspects of the present disclosure, the Tx AP may allocate random RUs to individual BSSIDs and/or to groups of STAs using AID values contained in one or more of the Per User Info fields of the first trigger frame 812A. In some implementations, the first trigger frame 812A may leverage the group-AID mappings in the partial virtual bitmap contained in the management frame 810 to identify specific BSSIDs and/or specific groups of stations using AID values.

In some aspects, the first trigger frame 812A may allocate random RUs to be shared by the STAs associated with the Tx BSSID by setting an AID value=0, for example, based on the Tx BSSID having a BSSID index=0. Each STA that receives the first trigger frame 812A may determine whether any random RUs are allocated to all of the STAs belonging to the multiple BSSID set by determining whether the first trigger frame 812A sets an AID value=0.

In some aspects, the first trigger frame 812A may allocate random RUs to be shared by the STAs associated with a selected non-Tx BSSID by setting an AID to the BSSID index of the selected non-Tx BSSID (based on mappings between the non-Tx BSSID's index and a corresponding AID value in the partial virtual bitmap). For example, the first trigger frame 812A may allocate random RUs to be shared by all STAs associated with the first non-Tx BSSID by setting an AID value=1, may allocate random RUs to be shared by all STAs associated with the second non-Tx BSSID by setting an AID value=2, may allocate random RUs to be shared by all STAs associated with the third non-Tx BSSID by setting an AID value=3, and so on. Each STA that receives the first trigger frame 812A may determine whether any random RUs are allocated to the STA's basic service set by determining whether the first trigger frame 812A contains an AID set to the BSSID of its associated AP.

In some aspects, the first trigger frame 812A may also allocate dedicated RUs to an individual STA associated with any of the basic service sets belonging to the multiple BSSID set by setting an AID value to the AID assigned to the individual STA. For example, the first trigger frame 812A may allocate dedicated RUs to STA5 of FIG. 8 by setting an AID value=9 (which is the AID value assigned to STA5). Each STA that receives the first trigger frame 812A may determine whether any random RUs are allocated for use by the STA by determining whether the first trigger frame 812A sets an AID value to the BSSID of its associated AP. In some aspects, the first trigger frame 812A may allocate random RUs to unassociated STAs by setting an AID value=2045.

In other implementations, the first trigger frame 812A may be transmitted by a non-Tx BSSID (such as by one of the other access points AP1-AP7). When transmitted by a non-Tx BSSID, the first trigger frame 812A may include a TA set to the BSSID index of the non-Tx BSSID, and may allocate random RUs to be shared by STAs associated with that non-Tx BSSID, for example, by setting an AID value=0. In addition, or in the alternative, the first trigger frame 812A may allocate random RUs for use by all unassociated stations by setting an AID value to 2045.

Because each STA in the multiple BSSID set stores the BSSID-index of its associated AP and also stores its assigned AID value, each STA in the multiple BSSID set may readily determine whether the first trigger frame 812A allocates random RUs for use by the STA based on two AIDs contained in the first trigger frame 812A: the AID corresponding to the BSSID index of the STA's associated AP, and the AID corresponding to the AID value assigned to the STA.

As depicted in the example operation 800 of FIG. 8, the first trigger frame 812A allocates a first resource unit RU1 as a random RU for use by all un-associated STAs by setting an AID value=2045, allocates a second resource unit RU2 as a random RU for use by the STAs associated with the basic service set having a BSSID index=3 by setting an AID value=3, allocates a third resource unit RU3 as a random RU for use by the STAs associated with the basic service set having a BSSID index=2 by setting an AID value=2, allocates a fourth resource unit RU4 as a random RU for use by the STAs associated with the basic service set having a BSSID index=1 by setting an AID value=1, allocates a fifth resource unit RU5 as a random RU for use by the STAs associated with the Tx BSSID by setting an AID value=0, and allocates a sixth resource unit RU6 as a dedicated RU to STA5 by setting an AID value=9.

The STAs may receive the first trigger frame 812A at (or around) time $t_3$. Each STA that receives the first trigger frame 812A may decode the RU allocation bitmap included in the first trigger frame 812A to determine whether any RUs are allocated or otherwise available to the STA. More specifically, each receiving STA may decode the AID values provided in the RU allocation bitmap to determine whether the trigger frame 812A allocated a dedicated RU to the STA or allocated one or more random RUs for which the STA may contend (such as by using the OBO procedure).

At time $t_4$, the STAs that were allocated either a dedicated RU or that gained access to one of the random RUs begin transmitting UL data 814A to the Tx AP. For the example of FIG. 8, one of the un-associated STAs transmits UL data on the first resource unit RU1, one of the STAs associated with BSSID=3 transmits UL data on the second resource unit RU2, one of the STAs associated with BSSID=2 transmits UL data on the third resource unit RU3, one of the STAs associated with BSSID=1 transmits UL data on the fourth resource unit RU4, one of the STAs associated with the Tx BSSID transmits UL data on the fifth resource unit RU5, and STA5 transmits UL data on the sixth resource unit RU6.

The Tx AP receives the UL data transmissions 814A at time $t_5$, and may acknowledge reception by transmitting an M-BA frame (not shown for simplicity). Thereafter, the Tx AP may transmit a second trigger frame 812B at time $t_6$ (which may indicate a beginning of a second TXOP 802). In the example operation 800 of FIG. 8, the second trigger frame 812B allocates the first resource unit RU1 as a random RU to the STAs associated with BSSID=2 by setting AID=0, allocates the second resource unit RU2 as a random RU to the STAs associated with BSSID=2 by setting a corresponding AID=0, allocates the third resource unit RU3 as a dedicated RU to STA6 by setting a corresponding AID=5, and allocates the fourth resource unit RU4 as a dedicated RU to STA5 by setting corresponding AID=8.

Each of the STAs may receive the second trigger frame 812B at (or around) time $t_7$, and may decode the RU allocation bitmap included in the second trigger frame 812B to determine whether any RUs are allocated or otherwise available to the STA. STAs that were either allocated dedicated resources or that gained access to random RUs begin transmitting UL data 814B at time $t_5$. In the example operation 800 of FIG. 8, one of the STAs associated with BSSID=2 transmits UL data on the first resource unit RU1 based on the value AID=0 in the RU allocation bitmap, one of the STAs associated with BSSID=2 transmits UL data on the second resource unit RU2 based on the value AID=0 in the RU allocation bitmap, STA6 transmits UL data on the third resource unit RU3 based on the value AID=5 in the RU allocation bitmap, and STA4 transmits UL data on the fourth resource unit RU4 based on the value AID=6 in the RU allocation bitmap. The Tx AP may receive the UL data transmissions 814B at time $t_9$, and may acknowledge reception by transmitting an M-BA frame (not shown for simplicity).

By allowing the Tx AP to allocate random RUs to STAs that are associated with the Tx BSSID and to STAs that are associated with one or more non-Tx BSSIDs, aspects of the present disclosure may isolate collisions on the wireless medium within each of the different BSSs that form the multiple BSSID set. In addition, because STAs already keep track of their associated BSSID's index value, STAs belonging to the multiple BSSID set can determine whether trigger frames disclosed herein allocate random RUs to their own BSSID or to one of the non-Tx BSSIDs without storing additional information.

In some other implementations, each of the APs (or virtual access points) in the multiple BSSID set may announce or advertise its own RAPS element, for example, using the non-Tx BSSID Profile contained in the Multiple BSSID element. For such implementations, the Tx BSSID may announce or advertise its own RAPS element in one or more beacon frames, and each of the non-Tx BSSIDs may select their RAPS values based on the number of STAs associated therewith. If a given non-Tx BSSID does not advertise its own RAPS value, then the STAs associated with given non-Tx BSSID may obtain the RAPS value from the Tx BSSID's RAPS element.

In some aspects, a trigger frame having a transmitter address set to a specific non-Tx BSSID can allocate random RUs only to STAs that are associated with the specific non-Tx BSSID. In some aspects, a random RU may have an AID12=0. In addition, or in the alternative, a random RU allocated in a trigger frame having a transmitter address set to the Tx BSSID can be used only by STAs associated with the Tx BSSID. For these implementations, collisions may remain isolated for each of the APs (or virtual APs).

In some other implementations, each AP (or virtual AP) advertises its own RAPS element, and the AP associated with the Tx BSSID transmits the beacon frames. The non-Tx BSSIDs advertise their RAPS values using the non-Tx BSSID Profile contained in the Multiple BSSID element. The non-Tx BSSIDs may select their RAPS values based on the number of STAs associated therewith. If a given non-Tx BSSID does not advertise its own RAPS value, then the STAs associated with the given non-Tx BSSID may use RAPS element provided by the Tx BSSID. A random RU in a trigger frame with a transmitter address set to the non-Tx BSSID may be used only by STAs associated with that non-Tx BSSID. In some aspects, a random RU may have an AID12=0, and a random RU allocated in a trigger frame having a transmitter address set to the Tx BSSID can be used by STAs associated with the multiple BSSID set.

In some aspects, STAs belonging to non-Tx BSSID may use the RAPS element advertised by the Tx BSSID. In other aspects, STAs belonging to one of the non-Tx BSSIDs may apply a scaling factor to account for differences between the RAPS element of the Tx BSSID and the RAPs value of their own BSSID. These implementations may increase collisions between STAs because a large number of STAs may try to access the random RUs, and may increase complexity because the STAs needs to track two RAPS values (rather than one RAPS value).

In some other implementations, only the Tx BSSID advertises its RAPS element. In some aspects, the non-Tx BSSID may use the RAPS element provided by the Tx BSSID. When a trigger frame with a transmitter address set to the Tx BSSID allocates random RUs, then either (1) only STAs associated with the Tx BSSID can use the random RUs, or (2) any STA belonging to the multiple BSSID set can use the random RUs. Only STAs associated with a non-Tx BSSID can use random RUs when the trigger frame has a transmitter address set to a non-Tx BSSID. In other aspects, only trigger frames sent by the Tx BSSID can allocate random RUs. Any STA of the multiple BSSID set can use RUs for random access.

In some implementations, unassociated STAs that have not received RAPS information from an AP may use a default RAPS parameter value (or OBO counter value) when initially communicating with the AP using random access channel mechanisms.

Figure 9:
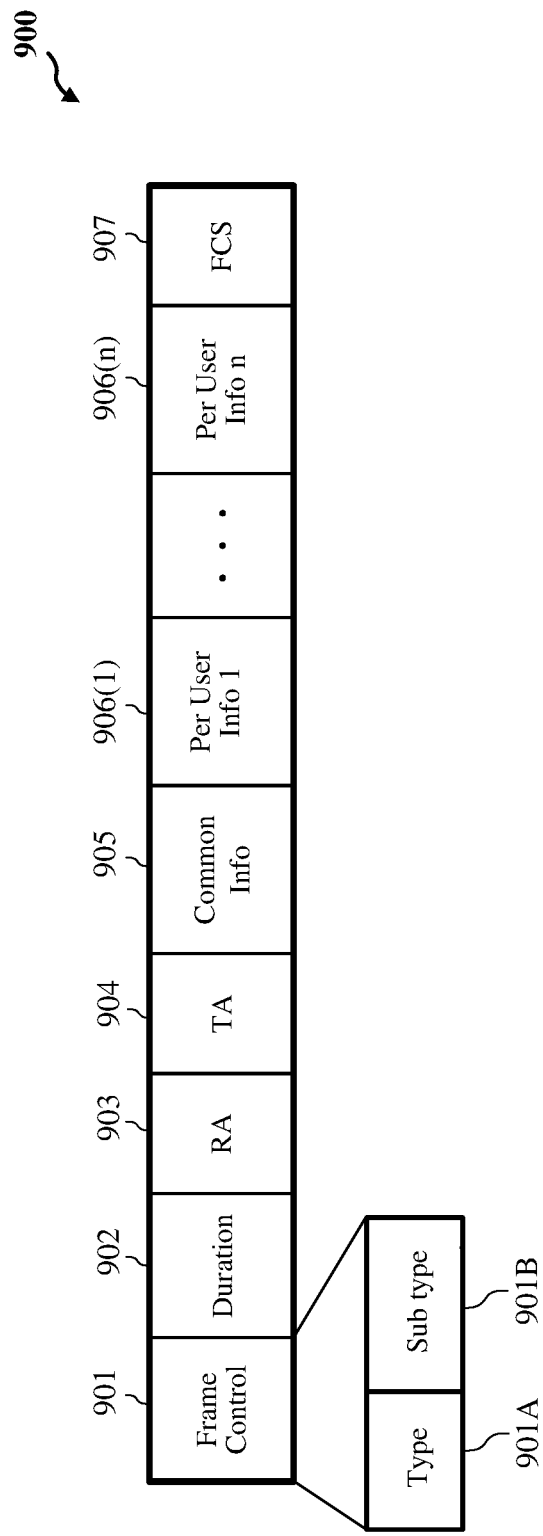
FIG. 9 shows an example trigger frame.

FIG. 9 shows an example trigger frame 900. The trigger frame 900 may be used as the directed trigger frame 602 of FIG. 6A, the wildcard trigger frame 612 of FIG. 6B, the trigger frame 712 of FIG. 7, or the trigger frames 812A-812B of FIG. 8. The trigger frame 900 is shown to include a frame control field 901, a duration field 902, a receiver address (RA) field 903, a transmitter address (TA) field 904, a Common Info field 905, a number of Per User Info fields 906(1)-906(n), and a frame check sequence (FCS) field 907.

The frame control field 901 includes a Type field 901A and a Sub-type field 901B. The Type field 901A may store a value to indicate that the trigger frame 900 is a control frame, and the Sub-type field 901B may store a value indicating a type of the trigger frame 900. The duration field 902 may store information indicating a duration or length of the trigger frame 900. The RA field 903 may store the address of a receiving device (such as one of the wireless stations STA1-STAn of FIGS. 6A, 6B, and 7). The TA field 904 may store the address of a transmitting device (such as the AP of FIGS. 6A, 6B, 7, and 8). The Common Info field 905 may store information common to one or more receiving devices, as described in more detail below with respect to FIG. 10A. Each of the Per User Info fields 906(1)-906(n) may store information for a particular receiving device including, for example, the AID of the receiving device. The FCS field 907 may store a frame check sequence (such as for error detection).

In some aspects, the trigger frame 900 may allocate dedicated RUs to associated STAs identified by AID values stored in corresponding ones of the Per User Info fields 906(1)-906(n). In other aspects, the trigger frame 900 may allocate random RUs to one or more groups of STAs using pre-defined AID values stored in the Per User Info fields 906(1)-906(n). For example, as described above, setting AID=0 in a trigger frame may allocate random RUs to STAs associated with the Tx AP, while setting an AID=2045 in a trigger frame may allocate random RUs to non-associated STAs.

Figure 10A:
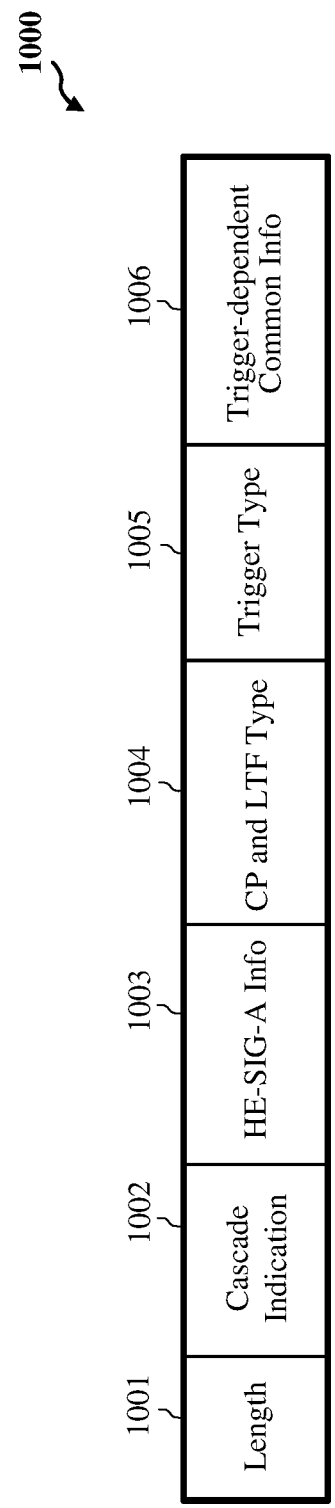
FIG. 10A shows an example Common Info field.

FIG. 10A shows an example Common Info field 1000. The Common Info field 1000 may be one implementation of the Common Info field 905 of the trigger frame 900. The Common Info field 1000 is shown to include a length subfield 1001, a cascade indication subfield 1002, a high-efficiency signaling A (HE-SIG-A) info subfield 1003, a cyclic prefix (CP) and legacy training field (LTF) type subfield 1004, a trigger type subfield 1005, and a trigger-dependent common info subfield 1006. The length subfield 1001 may indicate the length of a legacy signaling field of the UL data frames to be transmitted in response to the trigger frame 900. The cascade indication subfield 1002 may indicate whether a subsequent trigger frame follows the current trigger frame. The HE-SIG-A Info subfield 1003 may indicate the contents of a HE-SIG-A field of the UL data frames to be transmitted in response to the trigger frame 900. The CP and LTF type subfield 1004 may indicate the cyclic prefix and HE-LTF type of the UL data frames to be transmitted in response to the trigger frame 900. The trigger type subfield 1005 may indicate the type of trigger frame. The trigger-dependent common info subfield 1006 may indicate trigger-dependent information.

Figure 10B:
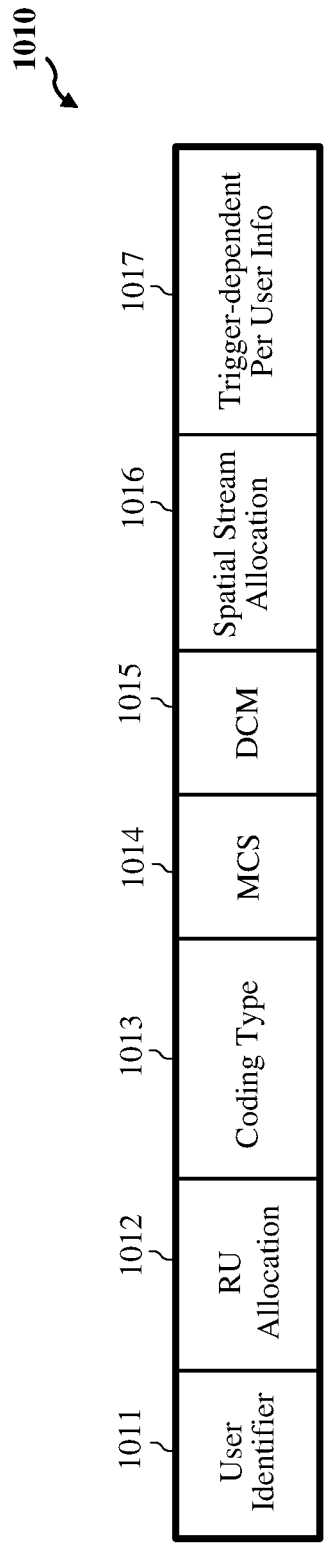
FIG. 10B shows an example Per User Info field.

FIG. 10B shows an example Per User Info field 1010. The Per User Info field 1010 may be one implementation of the Per User Info fields 906(1)-906(n) of the trigger frame 900. The Per User Info field 1010 is shown to include a User Identifier subfield 1011, an RU Allocation subfield 1012, a Coding Type subfield 1013, an MCS subfield 1014, a dual-carrier modulation (DCM) subfield 1015, a spatial stream (SS) Allocation subfield 1016, and a trigger-dependent Per User info subfield 1017. The User Identifier subfield 1011 may indicate the association identification (AID) of the STA to which a dedicated RU is allocated for transmitting UL MU data. The RU Allocation subfield 1012 may identify the dedicated RU allocated to the corresponding STA (such as the STA identified by the User Identifier subfield 1011). The Coding Type subfield 1013 may indicate the type of coding to be used by the corresponding STA when transmitting UL data using the allocated RU. The MCS subfield 1014 may indicate the MCS to be used by the corresponding STA when transmitting UL data using the allocated RU. The DCM subfield 1015 may indicate the dual carrier modulation to be used by the corresponding STA when transmitting UL data using the allocated RU. The SS Allocation subfield 1016 may indicate the number of spatial streams to be used by the corresponding STA when transmitting UL data using the allocated RU.

In some implementations, the value of the AID stored in the User Identifier subfield 1011 of the Per User Info field 1010 of the trigger frame 900 may indicate or identify the selected BSS to which random RUs identified in the RU Allocation subfield 1012 are allocated. In some aspects, the AID stored in the User Identifier subfield 1011 may be one of a number (N) of values, for example, to identify a corresponding one of N different BSSs to which one or more random RUs are allocated by the trigger frame 900. For one example in which the AP operates a number N=8 of independent BSSs, AID values of 0-7 may be used by the trigger frame 900 to identify a selected one of eight (8) BSSs to which the random RUs are allocated by the trigger frame 900. Thus, if the trigger frame 900 sets AID=1, then all wireless devices associated with or belonging to a BSS having a BSSID index=1 (such as the first basic service set BSS1 of FIG. 1B) may contend for access to the random RUs allocated by the trigger frame 900; if the trigger frame 900 sets AID=2, then all wireless devices associated with or belonging to a BSS having a BSSID index=2 (such as the second basic service set BSS2 of FIG. 1B) may contend for access to the random RUs allocated by the trigger frame 900; and so on.

Mappings between BSSID index values and AID values may be stored in the AP, for example, as described above with respect to FIG. 4. The AP may share the mappings between BSSID index values and AID values with its associated wireless devices. In some implementations, the AP may transmit one or more multiple BSSID elements in management frame (such as beacon frame or a probe response frame). The one or more multiple BSSID elements may be included in an information element (IE), in a vendor-specific information element (VSIE), in a packet extension, or in any other suitable portion or field of a management frame.

Figure 10C:
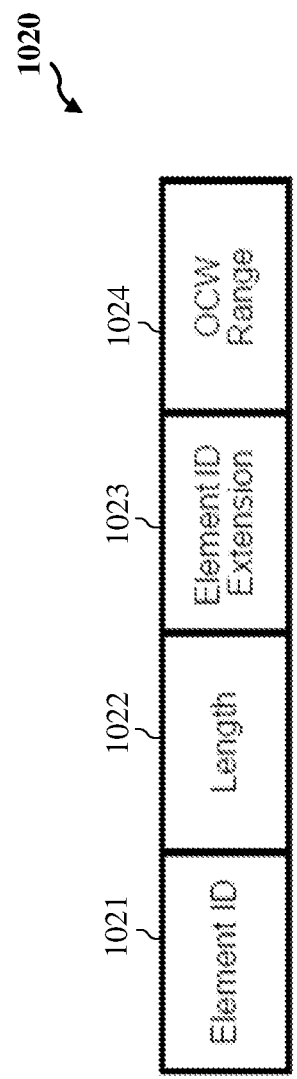
FIG. 10C shows an example Random Access Parameter Set (RAPS) element.

FIG. 10C shows an example RAPS element 1020 (which may also be referred to an UL OFDMA-based Random Access (UORA) Parameter Set element). The RAPS element 1020 is shown to include an element ID field 1021, a length field 1022, an element ID extension field 1023, and an OCW range field 1024. The element ID field 1021 may store a value (e.g., 255) indicating that the element is an extended type element and the element ID extension field 1023 may indicate element type (such as a RAPS element). The length field 1022 may store a value indicating a length of the RAPS element 1020. The OCW range field 1024 may indicate the minimum and maximum values of the OCW (OFDMA contention window).

As described above, a particular non-Tx BSSID may not allocate random RUs to its associated STAs. In some implementations, the particular non-Tx BSSID may indicate that it does not allocate random RUs by including, in the RAPS element 1020, a special value or dedicated field (not shown for simplicity) explicitly indicating that the particular non-Tx BSSID does not allocate random RUs. In other implementations, the particular non-Tx BSSID may indicate that it does not allocate random RUs by advertising a null RAPS element. In some aspects, the particular non-Tx BSSID may include a null RAPS element by omitting the Information field in the element (i.e., the OCW range field 1024 of the RAPS element 1020), for example, such that the RAPS element 1020 includes only the element ID field 1021, the element ID extension field 1023, and the length field 1022 (which may be set to 1). Stations receiving a null RAPS element may determine that the transmitting AP, or the AP corresponding to the null RAPSs element, does not allocate random RUs.

Figure 11A:
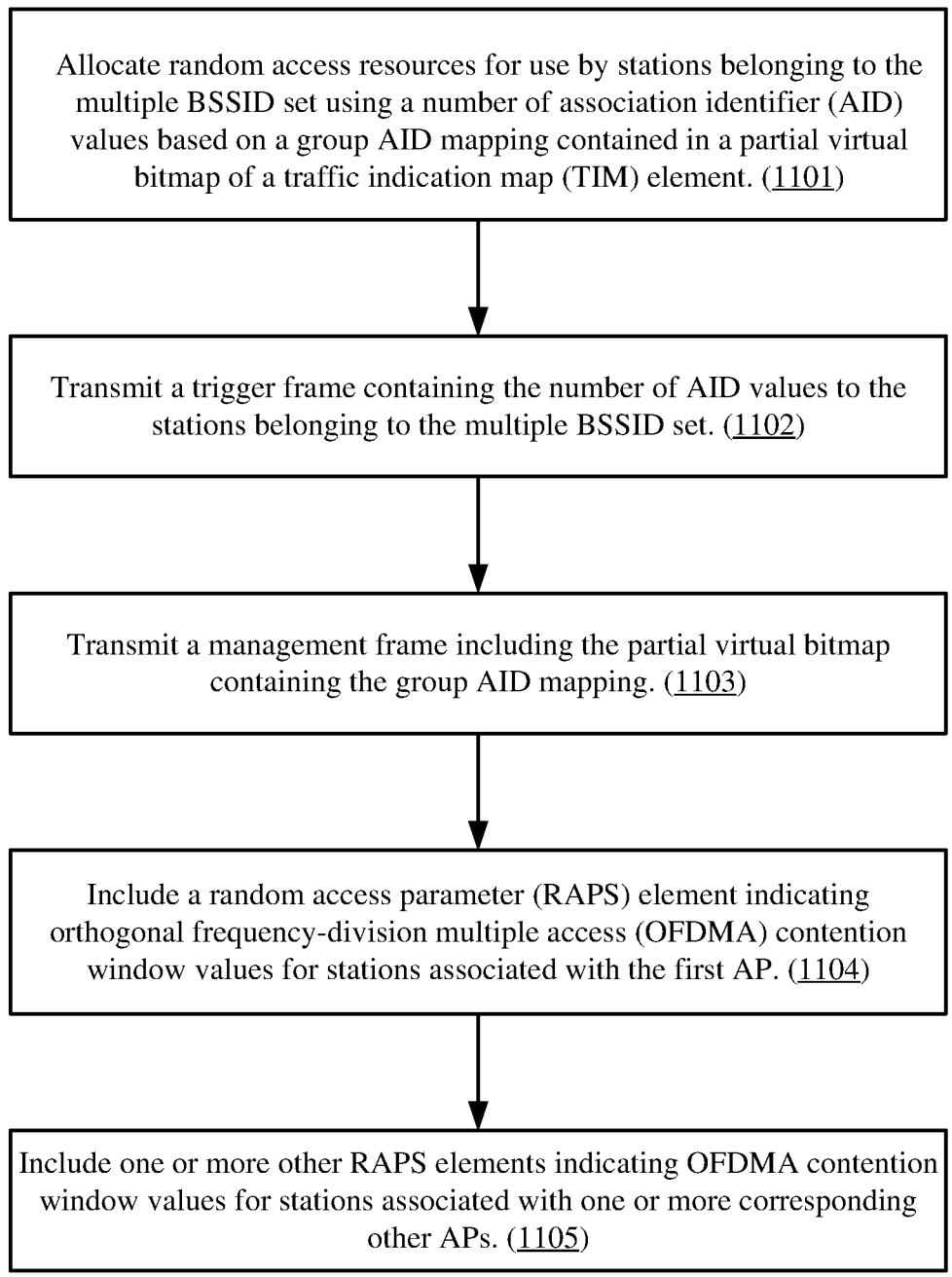
FIG. 11A shows an illustrative flow chart depicting an example operation for allocating wireless resources to a multiple basic service set identifier (BSSID) set.
Figure 11B:
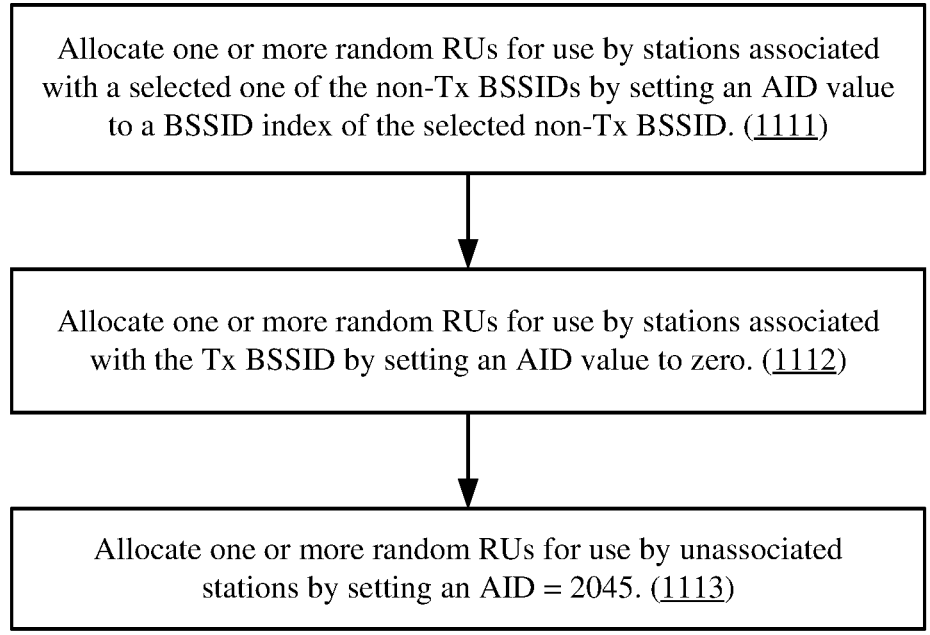
FIG. 11B shows an illustrative flow chart depicting an example operation for allocating random resource units (RUs) in a trigger frame transmitted from a transmitted BSSID.
Figure 11C:
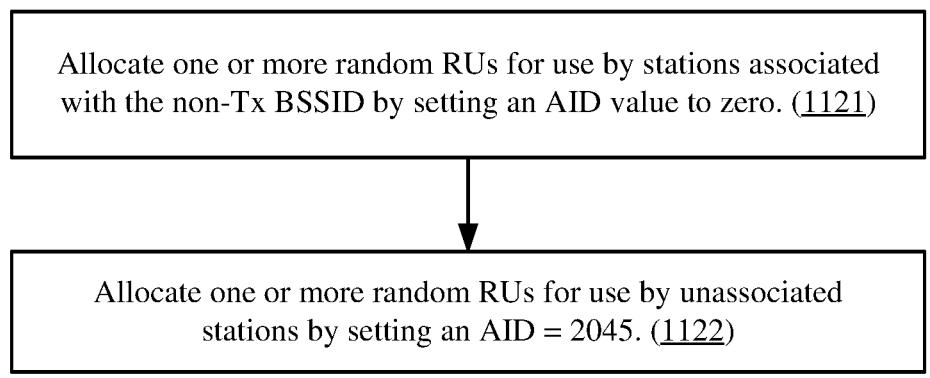
FIG. 11C shows an illustrative flow chart depicting an example operation for allocating random resource units (RUs) in a trigger frame transmitted from a non-transmitted BSSID.

FIG. 11A shows an illustrative flow chart depicting an example operation 1100 for allocating wireless resources to a multiple basic service set identifier (BSSID) set. The multiple BSSID set may include a number of BSSIDs each associated with a corresponding one of a number of access points (APs). The example operation 1100 is performed by a first access point (AP). The first AP may be the AP 110 of FIG. 1A, the AP 140 of FIG. 1B, the AP 400 of FIG. 4, or any other suitable AP.

The first AP may allocate random access resources for use by stations belonging to the multiple BSSID set using a number of association identifier (AID) values based on a group AID mapping contained in a partial virtual bitmap of a traffic indication map (TIM) element (1101). The trigger frame may solicit uplink (UL) transmissions from stations on the allocated random access resources. In some aspects, the number of AID values contained in the trigger frame may identify, for the allocation of the random access resources, at least one of a group of stations, a specific BSSID, a group of BSSIDs, and all of the stations belonging to the multiple BSSID set. For example, when the trigger frame is transmitted by Tx BSSID (such as the transmitter address (TA) is set to the MAC address of the Tx BSSID), a resource unit in the trigger frame corresponding to an AID value of zero (0) may indicate that random access resources are available for STAs associated with the Tx BSSID, a resource unit in the trigger frame corresponding to an AID value of n (where $0<k<2^n$) may indicate that random access resources are available STAs associated with the non-Tx BSSID assigned a BSSID index=k, a resource unit in the trigger frame corresponding to an AID value set to a first special value (such as AID=2047) may indicate that random access resource are available for all STAs belonging to the multiple BSSID set, and a resource unit in the trigger frame corresponding to an AID value set to a second special value (such as AID=2045) may indicate that random access resources are available for unassociated STAs. In other aspects, the first and second special values may other suitable integer values.

In some implementations, the first AP may be associated with a transmitted BSSID (Tx BSSID), and each of the other APs is associated with a corresponding non-transmitted BSSID (non-Tx BSSID). When a trigger frame is transmitted from the Tx BSSID (such as from the first AP operating as the Tx AP), the transmitter address (TA) of the trigger frame is set to the MAC address of the Tx BSSID. Referring also to the example operation 1110 of FIG. 11B, the first AP may allocate one or more random resource units (RUs) for use by stations associated with a selected one of the non-Tx BSSIDs by setting an AID value to a BSSID index of the selected non-Tx BSSID (1111). In addition, or in the alternative, the first AP may allocate one or more random RUs for use by stations associated with the Tx BSSID by setting an AID value to zero (1112). In addition, or in the alternative, the first AP may allocate one or more random RUs for use by all unassociated stations by setting an AID value to 2045 (1113).

In other implementations, the first AP may be associated with a non-Tx BSSID. When a trigger frame is transmitted from a non-Tx BSSID (such as from the first AP operating as a non-Tx AP), the transmitter address (TA) of the trigger frame is set to the MAC address of the non-Tx BSSID. Referring also to the example operation 1120 of FIG. 11C, the first AP may allocate one or more random RUs for use by stations associated with the non-Tx BSSID by setting an AID value to zero (1121). In addition, or in the alternative, the first AP may allocate one or more random RUs for use by all unassociated stations by setting an AID value to 2045 (1122).

The first AP may transmit a trigger frame containing the number of AID values to the stations belonging to the multiple BSSID set (1102). In some aspects, the trigger frame may contain the AID value set to the BSSID index of the selected non-Tx BSSID, for example, to allocate the one or more random RUs for use by stations associated with the selected non-Tx BSSID for UL transmissions. In other aspects, the trigger frame may contain the AID value set to zero, for example, to allocate the one or more random RUs for use by stations associated with the Tx BSSID for UL transmissions. In other aspects, the trigger frame may contain the AID value set to 2045, for example, to allocate the one or more random RUs for use by all of the unassociated stations for UL transmissions.

The first AP may transmit a management frame including the partial virtual bitmap containing the group AID mapping (1103). In some implementations, the partial virtual bitmap indicates at least one of a presence of group address traffic for the Tx BSSID, a presence of group address traffic for one or more of the non-Tx BSSIDs, and a presence of queued DL data for unassociated stations. The management frame may also contain a multiple BSSID element including an indication that the first AP operates the multiple BSSID set and is associated with the Tx BSSID. The multiple BSSID element may also include BSSID values assigned to the Tx BSSID and the non-Tx BSSIDs.

In some implementations, management frame may announce multiple BSSID capabilities of the first AP. The management frame also may include the multiple BSSID capabilities of the APs associated with the non-Tx BSSSIDs. In some aspects, the management frame may include a random access parameter (RAPS) element indicating orthogonal frequency-division multiple access (OFDMA) contention window values for stations associated with the first AP (1104). In some aspects, the management frame also includes, for each of the other APs, a corresponding RAPS element indicating OFDMA contention window values for stations associated with the respective one of the other APs (1105).

Figure 12:
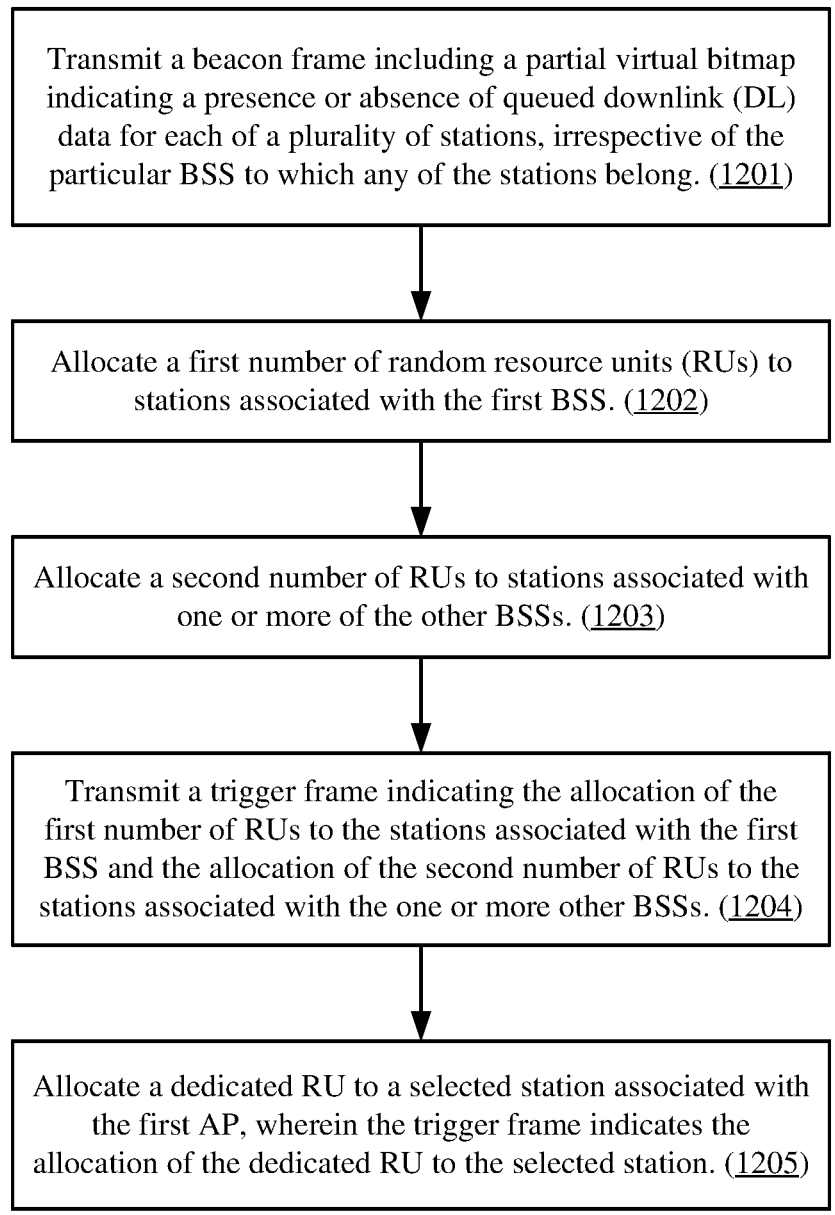
FIG. 12 shows an illustrative flow chart depicting another example operation for allocating wireless resources of a multiple BSSID set to a number of stations.

FIG. 12 shows an illustrative flow chart depicting another example operation 1200 for allocating wireless resources of a multiple basic service set identifier (BSSID) set to a number of stations (STAs). The BSSID set may include a first basic service set (BSS) associated with a first access point (AP) and a number of other BSSs each associated with a corresponding one of a number of other APs. In some implementations, the first AP may operate the BSSID set and may perform the example operation 1200. In some aspects, the first AP may be the AP 110 of FIG. 1A, the AP of FIG. 1B, or the AP 400 of FIG. 4. In other aspects, the first AP may be another suitable AP.

The first AP may transmit a beacon frame including a partial virtual bitmap indicating a presence or absence of queued downlink (DL) data for each of a plurality of stations, irrespective of the particular BSS to which any of the stations belong (1201). In some implementations, a first bit of the partial virtual bitmap indicates the presence or absence of DL data for stations associated with the first AP, each of a number of second bits of the partial virtual bitmap indicates the presence or absence of DL data for stations associated with a corresponding one of the number of other APs, and a third bit of the partial virtual bitmap indicates the presence or absence of DL data for stations not associated with any of the APs.

The beacon frame may include a multiple BSSID element indicating that the first AP operates the multiple BSSID set and is associated with the first BSS. In some aspects, the multiple BSSID element may indicate a BSSID index for the first AP and indicates a BSSID index for each of the number of other APs. The beacon frame may also indicate multiple BSSID capabilities of the first AP and indicates multiple BSSID capabilities of each of the number of other APs. In addition, or in the alternative, the beacon frame may include a random access parameter (RAPS) element indicating orthogonal frequency-division multiple access (OFDMA) contention window values for stations associated with the first AP. In some aspects, the beacon frame may also include, for each of the number of other APs, a corresponding RAPS element indicating OFDMA contention window values for stations associated with the respective one of the other APs.

The first AP may allocate a first number of random resource units (RUs) for use by stations associated with the first BSS (1202), and may allocate a second number of RUs for use by stations associated with one or more of the other BSSs (1203).

The first AP may transmit a trigger frame indicating the allocation of the first number of RUs for use by stations associated with the first BSS and the allocation of the second number of RUs for use by stations associated with the one or more other BSSs (1204).

The first AP may allocate a dedicated RU to a selected station associated with the first AP, and the trigger frame may indicate the allocation of the dedicated RU to the selected station (1205). In this manner, a single trigger frame may allocate dedicated RUs to one or more selected stations associated with the first AP while also allocating random RUs to a number of stations, irrespective of whether the stations are associated with the AP that transmitted the trigger frame.

Figure 13:
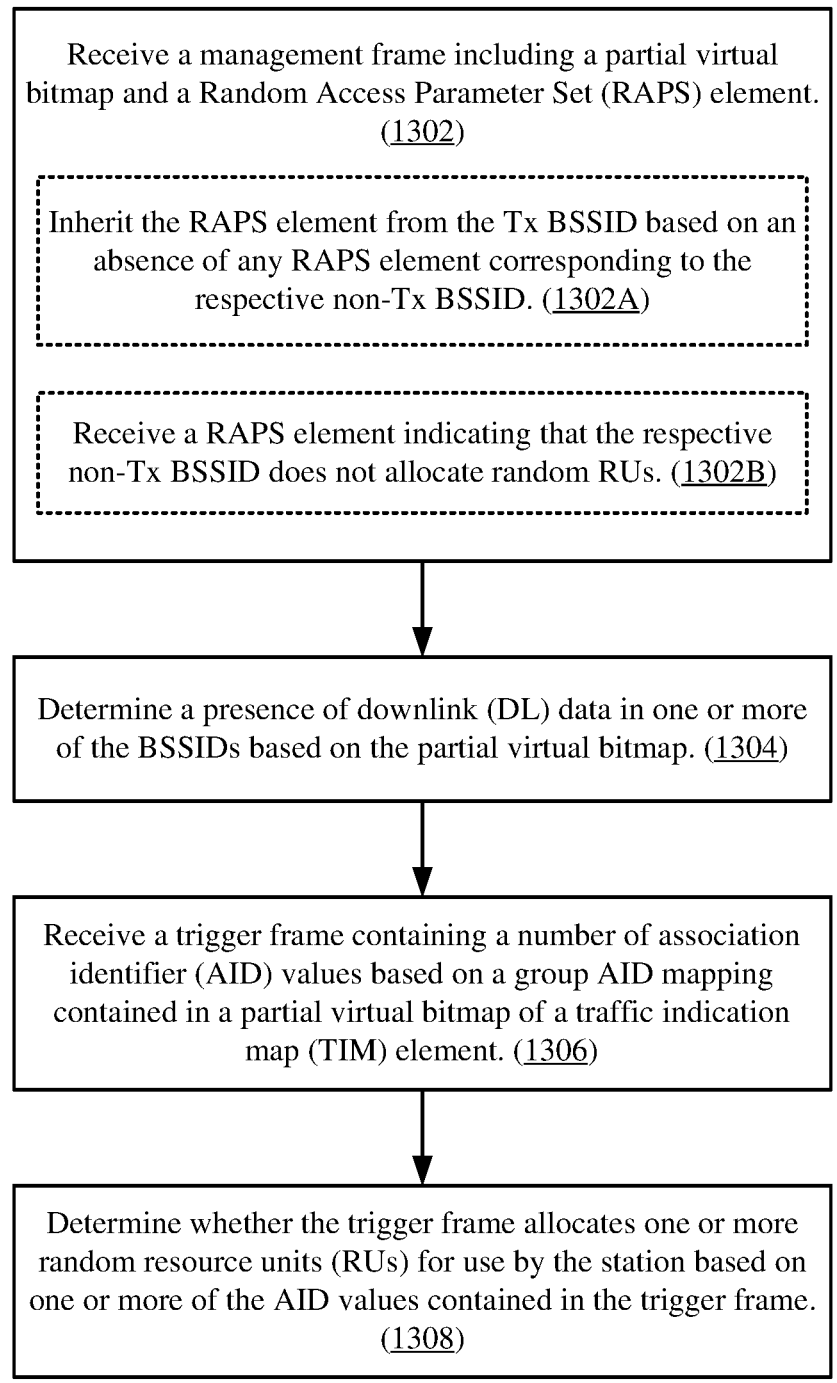
FIG. 13 shows an illustrative flow chart depicting an example operation for operating a wireless station in a multiple basic service set identifier (BSSID) set.

FIG. 13 shows an illustrative flow chart depicting an example operation 1300 for operating a wireless station in a multiple basic service set identifier (BSSID) set. The multiple BSSID set may include a transmitted BSSID (Tx BSSID) and a number of non-transmitted BSSIDs (non-Tx BSSIDs). In some implementations, the wireless station may be one of the stations STA1-STA4 of FIG. 1A, one of the stations STA1-STA99 of FIG. 1B, or the STA 300 of FIG. 3. In other aspects, the wireless station may be another suitable wireless device.

The wireless station receives a management frame including a partial virtual bitmap and a number of random access parameter set (RAPS) elements (1302). Each RAPS element may indicate orthogonal frequency-division multiple access (OFDMA) contention window values for stations associated with a corresponding one of the BSSIDs. In some aspects, each RAPS element may include an OFDMA Contention Window (OCW) range field that stores a minimum OCW value and a maximum OCW value for a corresponding BSSID. During random channel access operations, each of the receiving stations may select an OBO count value that is between the minimum OCW value and the maximum OCW value indicated in the corresponding RAPS element.

In some implementations, the management frame is transmitted by the Tx BSSID and may include a RAPS element for the Tx BSSID. If the wireless station belongs to a respective one of the non-Tx BSSIDs and has not received a RAPS element corresponding to the respective non-Tx BSSID, the wireless station may inherit the RAPS element of the Tx BSSID based on the absence of any RAPS element corresponding to the respective non-Tx BSSID (1302A).

In other implementations, the wireless station may belong to respective one of the non-Tx BSSIDs that does not allocate random RUs to its associated stations. The respective non-Tx BSSID may indicate that it does not allocate random RUs to its associated stations in a corresponding RAPS element. In some implementations, the wireless station may receive a RAPS element indicating that the respective non-Tx BSSID does not allocate random RUs to its associated stations (1302B). In some aspects, the RAPS element may include a special value or a dedicated field explicitly indicating that the respective non-Tx BSSID does not allocate random RUs. Wireless stations receiving a RAPS element that includes the special value or the dedicated field may determine that the non-Tx BSSID corresponding to the received RAPS element does not allocate random RUs to wireless stations.

In other aspects, the RAPS element may include a length field set to one or may be missing an OFDMA contention window (OCW) range field to indicate that the respective non-Tx BSSID does not allocate random RUs. Wireless stations receiving a RAPS element that includes a length field set to one or that does not include an OFDMA contention window (OCW) range field may determine that the non-Tx BSSID corresponding to the received RAPS element does not allocate random RUs to wireless stations.

The wireless station may determine a presence of downlink (DL) data in one or more of the BSSIDs based on the partial virtual bitmap (1304). In some implementations, the partial virtual bitmap may allow an AP to indicate the presence of group address traffic for the Tx BSSID, to indicate the presence of group address traffic for each of the non-Tx BSSIDs, and to indicate the presence of queued downlink (DL) data for STAs associated with any of the different BSSs belonging to the multiple BSSID set 130 (irrespective of whether the STAs are associated with the Tx BSSID or one of the non-Tx BSSIDs) using a single traffic indication map (TIM) element, as described above.

The wireless station may receive a trigger frame containing a number of association identifier (AID) values based on a group AID mapping contained in the partial virtual bitmap of a traffic indication map (TIM) element (1306). In some implementations, the trigger frame is received from an access point (AP) corresponding to the Tx BSSID and includes a transmitter address (TA) set to a MAC address of the Tx BSSID. In other implementations, the trigger frame is received from an access point (AP) corresponding to a respective one of the non-Tx BSSIDs and includes a transmitter address (TA) set to a MAC address of the respective non-Tx BSSID.

The wireless station may determine whether the trigger frame allocates one or more random resource units (RUs) for use by the station based on one or more of the AID values contained in the trigger frame (1308). When the trigger frame is received from an AP corresponding to the Tx BSSID and the wireless station is associated with the Tx BSSID, the wireless station may determine whether the trigger frame allocates one or more random RUs for use by the station by identifying, in the trigger frame, an AID value set to zero. When the trigger frame is received from an AP corresponding to the Tx BSSID and the wireless station is associated with respective one of the non-Tx BSSIDs, the wireless station may determine whether the trigger frame allocates one or more random RUs for use by the station by identifying, in the trigger frame, an AID value set to a BSSID index of the respective non-Tx BSSID. When the wireless station is not associated with any of the BSSIDs, the wireless station may determine whether the trigger frame allocates one or more random RUs for use by the station by identifying, in the trigger frame, an AID value set to 2045.

When the trigger frame is received from an AP corresponding to a respective one of the non-Tx BSSIDs and the station wireless station is associated with the respective non-Tx BSSID, the wireless station may determine whether the trigger frame allocates one or more random RUs for use by the station by identifying, in the trigger frame, an AID value set to zero. When the trigger frame is received from an AP corresponding to a respective one of the non-Tx BSSIDs and the wireless station is not associated with any of the BSSIDs, the wireless station may determine whether the trigger frame allocates one or more random RUs for use by the station by identifying, in the trigger frame, an AID value set to 2045.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of allocating wireless resources to a multiple basic service set identifier (BSSID) set including a transmitted BSSID and one or more non-transmitted BSSIDs, the method performed by an access point (AP) associated with the transmitted BSSID, the method comprising:
    allocating random access resource units (RUs) for uplink (UL) transmissions from wireless stations (STAs) of the multiple BSSID set using association identifier (AID) values based on a group AID mapping contained in a partial virtual bitmap of a traffic indication map (TIM) element; and
    transmitting one or more trigger frames including a number of the AID values based on the group AID mapping contained in the partial virtual bitmap of the TIM element, the number of AID values including one or more of an AID value set to zero, an AID value set to 2045, or an AID value set to 2047.

2. The method of claim 1, wherein trigger frames including the AID value set to zero are configured to allocate one or more of the random access RUs to STAs associated with the transmitted BSSID.

3. The method of claim 1, wherein trigger frames including the AID value set to 2045 are configured to allocate one or more of the random access RUs to unassociated STAs of the multiple BSSID set.

4. The method of claim 1, wherein trigger frames including the AID value set to 2047 are configured to allocate one or more of the random access RUs to all STAs of the multiple BSSID set.

5. The method of claim 1, wherein at least one of the trigger frames includes an AID value set to the BSSID index of the respective non-transmitted BSSID, the AID value set to the BSSID index configured to allocate one or more of the random access RUs to STAs associated with the respective non-transmitted BSSID.

6. The method of claim 1, wherein at least one of the trigger frames comprises a broadcast frame configured to allow any STA of the multiple BSSID set to contend for channel access to random access RUs identified by the at least one trigger frame.

7. The method of claim 1, wherein at least one of the trigger frames comprises a multicast frame configured to allow a selected group of STAs of the multiple BSSID set to contend for channel access to random access RUs identified by the at least one trigger frame.

8. The method of claim 1, wherein at least one of the trigger frames includes a transmitter address set to the BSSID index of the transmitted BSSID.

9. The method of claim 8, wherein the at least one trigger frame allocates one or more random access RUs for UL transmissions to STAs associated with the transmitted BSSID.

10. The method of claim 1, wherein at least one of the trigger frames includes an AID12 subfield set to zero.

11. The method of claim 1, further comprising:
transmitting a management frame including the partial virtual bitmap containing the group AID mapping.

12. The method of claim 11, wherein the partial virtual bitmap indicates one or more of a presence of group address traffic for the transmitted BSSID, a presence of group address traffic for one or more of the non-transmitted BSSIDs, or a presence of queued downlink (DL) data for unassociated stations.

13. The method of claim 1, further comprising:
transmitting a beacon frame indicating a presence or absence of traffic to be delivered to STAs associated with the transmitted BSSID or to STAs associated with the one or more non-transmitted BSSIDs.

14. The method of claim 13, wherein the beacon frame includes the partial virtual bitmap containing the group AID mapping, the partial virtual bitmap including, for each BSSID of the transmitted BSSID and the one or more non-transmitted BSSIDs, a corresponding bit indicating a presence or absence of downlink (DL) data for the respective BSSID.

15. The method of claim 14, wherein the partial virtual bitmap includes a plurality of additional bits, each of the additional bits indicating a presence or absence of DL data for a respective STA of the multiple BSSID set.

16. An access point (AP) associated with a transmitted BSSID belonging to a multiple basic service set identifier (BSSID) set including one or more non-transmitted BSSIDs, comprising:
one or more processors configured to allocate random access resource units (RUs) for uplink (UL) transmissions from wireless stations (STAs) of the multiple BSSID set using association identifier (AID) values based on a group AID mapping contained in a partial virtual bitmap of a traffic indication map (TIM) element; and
one or more transceivers configured to transmit one or more trigger frames including a number of the AID values based on the group AID mapping contained in the partial virtual bitmap of the TIM element, the number of AID values including one or more of an AID value set to zero, an AID value set to 2045, or an AID value set to 2047.

17. The AP of claim 16, wherein trigger frames including the AID value set to zero are configured to allocate one or more of the random access RUs to STAs associated with the transmitted BSSID.

18. The AP of claim 16, wherein trigger frames including the AID value set to 2045 are configured to allocate one or more of the random access RUs to unassociated STAs of the multiple BSSID set.

19. The AP of claim 16, wherein trigger frames including the AID value set to 2047 are configured to allocate one or more of the random access RUs to all STAs of the multiple BSSID set.

20. The AP of claim 16, wherein at least one of the trigger frames includes an AID value set to the BSSID index of the respective non-transmitted BSSID, the AID value set to the BSSID index configured to allocate one or more of the random access RUs to STAs associated with the respective non-transmitted BSSID.

21. The AP of claim 16, wherein at least one of the trigger frames comprises a broadcast frame configured to allow any STA of the multiple BSSID set to contend for channel access to random access RUs identified by the at least one trigger frame.

22. The AP of claim 16, wherein at least one of the trigger frames comprises a multicast frame configured to allow a selected group of STAs of the multiple BSSID set to contend for channel access to random access RUs identified by the at least one trigger frame.

23. The AP of claim 16, wherein at least one of the trigger frames includes a transmitter address set to the BSSID index of the transmitted BSSID.

24. The AP of claim 23, wherein the at least one trigger frame allocates one or more random access RUs for UL transmissions to STAs associated with the transmitted BSSID.

25. The AP of claim 16, wherein at least one of the trigger frames includes an AID12 subfield set to zero.

26. The AP of claim 16, wherein the one or more transceivers are further configured to transmit a management frame including the partial virtual bitmap containing the group AID mapping.

27. The AP of claim 26, wherein the partial virtual bitmap indicates one or more of a presence of group address traffic for the transmitted BSSID, a presence of group address traffic for one or more of the non-transmitted BSSIDs, or a presence of queued downlink (DL) data for unassociated stations.

28. The AP of claim 16, wherein the one or more transceivers are further configured to transmit a beacon frame indicating a presence or absence of traffic to be delivered to STAs associated with the transmitted BSSID or to STAs associated with the one or more non-transmitted BSSIDs.

29. The AP of claim 28, wherein the beacon frame includes the partial virtual bitmap containing the group AID mapping, the partial virtual bitmap including, for each BSSID of the transmitted BSSID and the one or more non-transmitted BSSIDs, a corresponding bit indicating a presence or absence of downlink (DL) data for the respective BSSID.

30. The AP of claim 29, wherein the partial virtual bitmap includes a plurality of additional bits, each of the additional bits indicating a presence or absence of DL data for a respective STA of the multiple BSSID set.

* * * * *